(12) United States Patent
Brady et al.

(10) Patent No.: US 8,401,949 B1
(45) Date of Patent: Mar. 19, 2013

(54) METHOD, SYSTEM AND APPARATUS FOR WEALTH MANAGEMENT

(75) Inventors: Mairtin Brady, Greenwich, CT (US);
Milda Darguzaite, Brooklyn, NY (US);
Nilam Kapadia, Clifton, NJ (US);
Donough Kilmurray, London (GB);
Per Mikkelsen, Brooklyn, NY (US);
Antonio Monteiro, Florham Park, NJ (US); Michael Smith, Ridgewood, NJ (US)

(73) Assignee: Goldman, Sachs & Co., New York, NY (US)

( * ) Notice: Subject to any disclaimer, the term of this patent is extended or adjusted under 35 U.S.C. 154(b) by 127 days.

(21) Appl. No.: 12/692,532

(22) Filed: Jan. 22, 2010

Related U.S. Application Data

(63) Continuation of application No. 11/610,383, filed on Dec. 13, 2006, now Pat. No. 7,680,719, and a continuation of application No. 11/609,876, filed on Dec. 12, 2006.

(51) Int. Cl.
*G06Q 40/00* (2012.01)
(52) U.S. Cl. .......................................................... 705/36
(58) Field of Classification Search ...................... 705/36
See application file for complete search history.

(56) References Cited

U.S. PATENT DOCUMENTS

| | | | |
|---|---|---|---|
| 5,193,056 A | 3/1993 | Boes | |
| 5,202,827 A | 4/1993 | Sober | |
| 5,774,881 A | 6/1998 | Friend et al. | |
| 5,884,287 A | 3/1999 | Edesess | |
| 5,987,433 A | 11/1999 | Crapo | |
| 6,018,722 A | 1/2000 | Ray et al. | |
| 6,021,397 A | 2/2000 | Jones et al. | |
| 6,061,662 A | 5/2000 | Makivic | |
| 6,078,904 A | 6/2000 | Rebane | |
| 6,115,697 A | 9/2000 | Gottstein | |
| 6,240,399 B1 | 5/2001 | Frank et al. | |
| 6,275,814 B1 | 8/2001 | Giansante et al. | |
| 6,321,212 B1 | 11/2001 | Lange | |
| 6,336,103 B1 | 1/2002 | Baker | |

(Continued)

FOREIGN PATENT DOCUMENTS

| | | |
|---|---|---|
| CA | 2309853 A1 | 11/2001 |
| CA | 2321809 A1 | 12/2001 |

(Continued)

OTHER PUBLICATIONS

Black and Litterman, "Global Portfolio Optimization"; Oct. 1992.*

(Continued)

*Primary Examiner* — Charles Kyle
*Assistant Examiner* — Clifford Madamba
(74) *Attorney, Agent, or Firm* — Perkins Coie LLP

(57) ABSTRACT

The invention enables a system user to create a scenario that includes an analysis resolution, portfolio component data and analysis environment data. Once the scenarios are established, the system user can conduct processing/modeling/analysis in order to optimize the portfolio allocation data—effectively maximizing the return on the component investments, while minimizing the risk exposure for the portfolio. In achieving the optimization, the system can process stored user or system defined scenarios based on a series of modeling/analysis system modules. Further, it is possible for a system user to model, analyze and compare multiple scenarios historically or prospectively. The system may provide wealth outcome analysis which allows a user to determine likely long term outcomes of a particular investment plan, while accounting for the tax consequences of the chosen plan. In an implementation, the system is configured to store the modeling/analysis results and generate a scenario report. Further, the system can be configured to generate the report in a standardized format and automatically distribute the report to designated recipients.

27 Claims, 14 Drawing Sheets

U.S. PATENT DOCUMENTS

| | | |
|---|---|---|
| 6,381,586 B1 | 4/2002 | Glasserman et al. |
| 6,405,179 B1 | 6/2002 | Rebane |
| 6,430,542 B1 | 8/2002 | Moran |
| 6,453,303 B1 | 9/2002 | Li |
| 6,556,992 B1 | 4/2003 | Barney et al. |
| 6,564,191 B1 | 5/2003 | Reddy |
| 6,578,016 B1 | 6/2003 | Trankina et al. |
| 6,832,209 B1 | 12/2004 | Karp et al. |
| 6,839,656 B1 | 1/2005 | Ackermann et al. |
| 6,928,418 B2 * | 8/2005 | Michaud et al. ............ 705/36 R |
| 6,947,904 B1 | 9/2005 | Macey |
| 6,985,880 B1 | 1/2006 | Hodgdon et al. |
| 7,010,510 B1 | 3/2006 | Schellhorn |
| 7,016,870 B1 | 3/2006 | Jones et al. |
| 7,016,873 B1 | 3/2006 | Peterson et al. |
| 7,031,935 B1 * | 4/2006 | Chhabra et al. ............ 705/36 T |
| 7,062,458 B2 | 6/2006 | Maggioncalda et al. |
| 7,177,831 B1 | 2/2007 | O'Shaughnessy et al. |
| 2002/0002521 A1 | 1/2002 | Shearer et al. |
| 2002/0013750 A1 | 1/2002 | Roberts et al. |
| 2002/0013754 A1 | 1/2002 | Frank et al. |
| 2002/0035527 A1 | 3/2002 | Corrin |
| 2002/0059127 A1 | 5/2002 | Brown et al. |
| 2002/0091604 A1 | 7/2002 | Loeper |
| 2002/0123953 A1 | 9/2002 | Goldfarb et al. |
| 2002/0143682 A1 | 10/2002 | Bergmann et al. |
| 2002/0147670 A1 | 10/2002 | Lange |
| 2002/0147671 A1 | 10/2002 | Sloan et al. |
| 2002/0189958 A1 | 12/2002 | Gordon et al. |
| 2003/0046203 A1 | 3/2003 | Ichihari et al. |
| 2003/0078867 A1 | 4/2003 | Scott et al. |
| 2003/0088492 A1 | 5/2003 | Damschroder |
| 2003/0105702 A1 | 6/2003 | Long et al. |
| 2003/0105703 A1 | 6/2003 | Palsky et al. |
| 2003/0110061 A1 | 6/2003 | Lakenbach et al. |
| 2003/0120577 A1 | 6/2003 | Sakui et al. |
| 2003/0126054 A1 | 7/2003 | Purcell |
| 2003/0208427 A1 | 11/2003 | Peters et al. |
| 2003/0229561 A1 | 12/2003 | Wallman |
| 2004/0024679 A1 | 2/2004 | Wallman |
| 2004/0064392 A1 | 4/2004 | Barkman |
| 2004/0078244 A1 | 4/2004 | Katcher |
| 2004/0103056 A1 | 5/2004 | Ikeda et al. |
| 2004/0117286 A1 | 6/2004 | Charnley |
| 2004/0133439 A1 | 7/2004 | Noetzold et al. |
| 2004/0181479 A1 | 9/2004 | Zosin et al. |
| 2004/0186803 A1 | 9/2004 | Weber et al. |
| 2004/0186804 A1 | 9/2004 | Chakraborty et al. |
| 2004/0215551 A1 | 10/2004 | Eder |
| 2004/0220842 A1 | 11/2004 | Barney |
| 2005/0004856 A1 | 1/2005 | Brose et al. |
| 2005/0071266 A1 | 3/2005 | Eder |
| 2005/0108134 A1 | 5/2005 | Harlow et al. |
| 2005/0187850 A1 | 8/2005 | Horowitz et al. |
| 2005/0197947 A1 | 9/2005 | Tyson |
| 2005/0209959 A1 | 9/2005 | Tenney |
| 2005/0256795 A1 | 11/2005 | Markov et al. |
| 2005/0278252 A1 | 12/2005 | Richmond |
| 2006/0020526 A1 | 1/2006 | Viner |
| 2006/0020531 A1 | 1/2006 | Veeneman et al. |
| 2006/0041489 A1 | 2/2006 | Arnott |
| 2006/0064364 A1 | 3/2006 | Whitehead |
| 2006/0190369 A1 | 8/2006 | Ryles et al. |
| 2006/0200395 A1 | 9/2006 | Masuyama et al. |
| 2006/0200400 A1 | 9/2006 | Hunter et al. |
| 2007/0192223 A1 | 8/2007 | Cifrese et al. |
| 2007/0244777 A1 | 10/2007 | Torre et al. |
| 2007/0282759 A1 | 12/2007 | Devries et al. |

FOREIGN PATENT DOCUMENTS

| | | |
|---|---|---|
| CA | 2530764 A1 | 8/2005 |
| JP | 2002-207870 A | 7/2002 |
| JP | 2006-134269 A | 5/2006 |
| WO | WO 00/58900 A1 | 10/2000 |
| WO | WO 01/31538 A1 | 5/2001 |
| WO | WO 01/42884 A2 | 6/2001 |
| WO | WO 03/023566 A2 | 3/2003 |
| WO | WO 2005/098723 A2 | 10/2005 |

OTHER PUBLICATIONS

Härdie, Wolfgang et al., "Applied Quantitative Finance," 423 pages, Jun. 20, 2002.

Ibbotson Associates, "iPlan™," 2 pages, 2006.

Informa Investment Solutions, "About PSN," 15 pages, prior to Nov. 16, 2006.

Lund, Jesper, Master's Thesis for "Dynamic Models Of The Term Structure Of Interest Rates," Department of Finance, The Aarhus School of Business, 212 pages, Jul. 1993.

Malfas, Gregory P., Master's Thesis for "Historical Risk Assessment Of A Balanced Portfolio Using Value At-Risk," Worcester Polytechnic Institute, 43 pages, Apr. 2004.

Morningstar, "Morningstar U.S.—Ibbotson Web Site Integration," 1 page, 2006.

Osorio, Maria A. et al., "Post-Tax Optimization With Stochastic Programming," European Journal Of Operational Research, vol. 157, pp. 152-168, 2004.

Spitzer, John J. et al., "The Fallacy Of Cookie Cutter Asset Allocation: Some Evidence From 'New York's College Savings Program,'" Financial Services Review, vol. 10, pp. 101-116, 2001.

Zephyr, "Allocation Advisor," 16 pages, prior to Nov. 16, 2006.

* cited by examiner

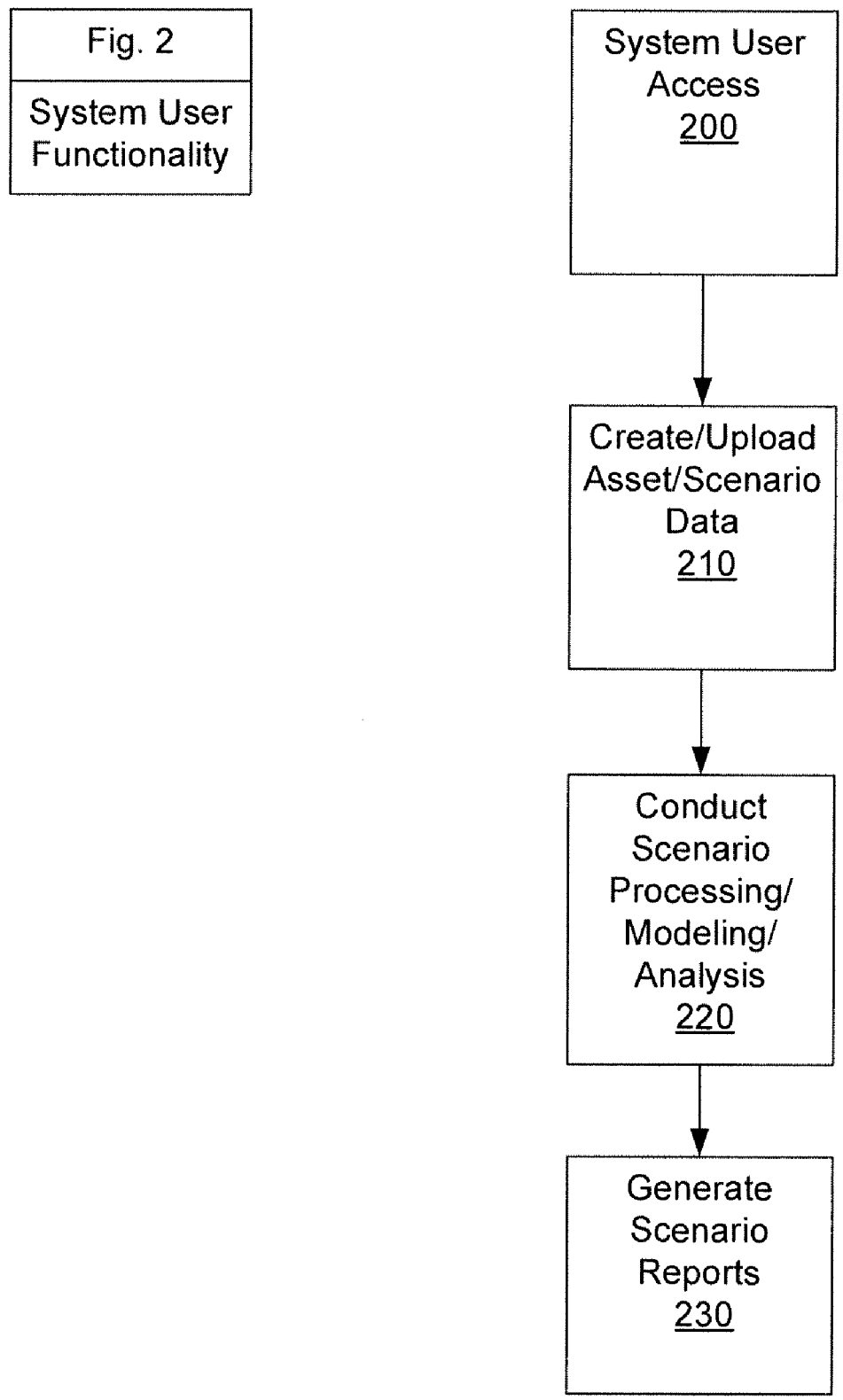

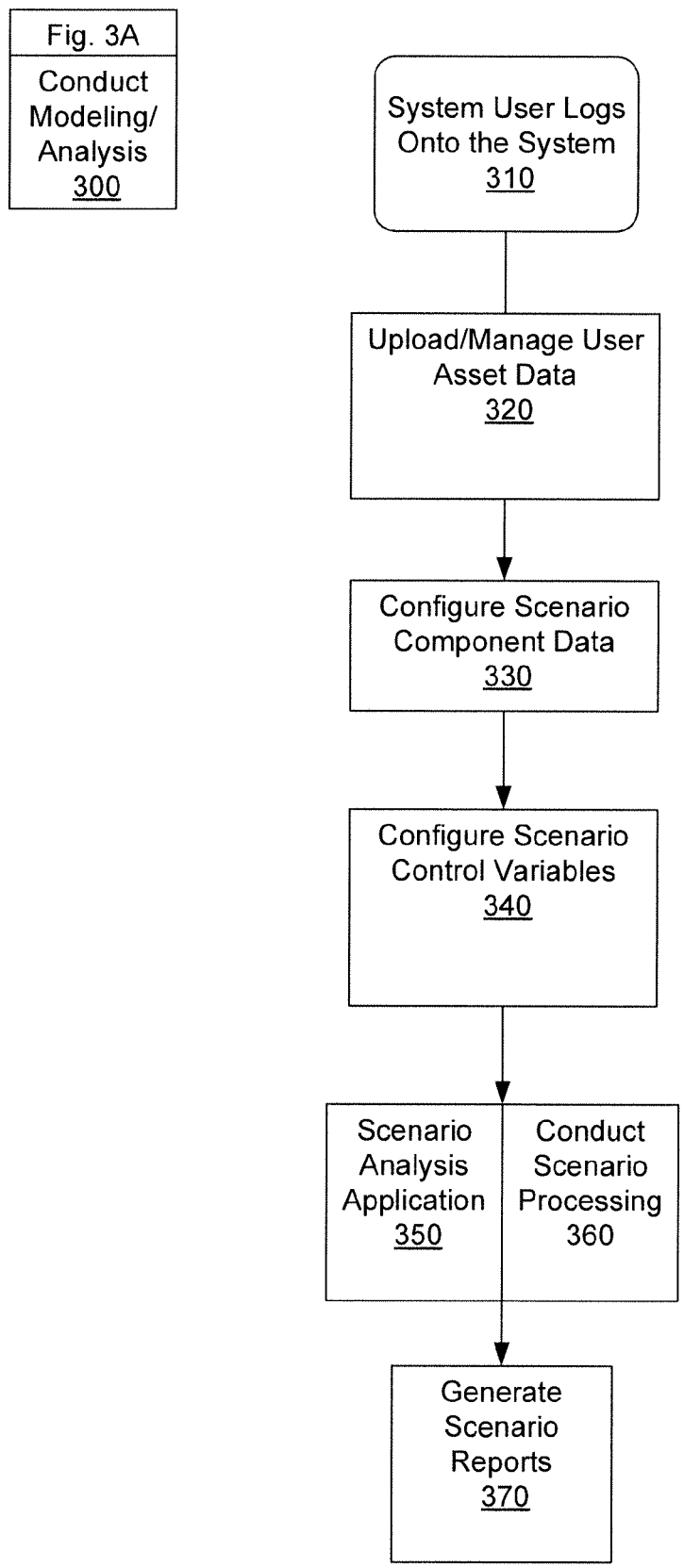

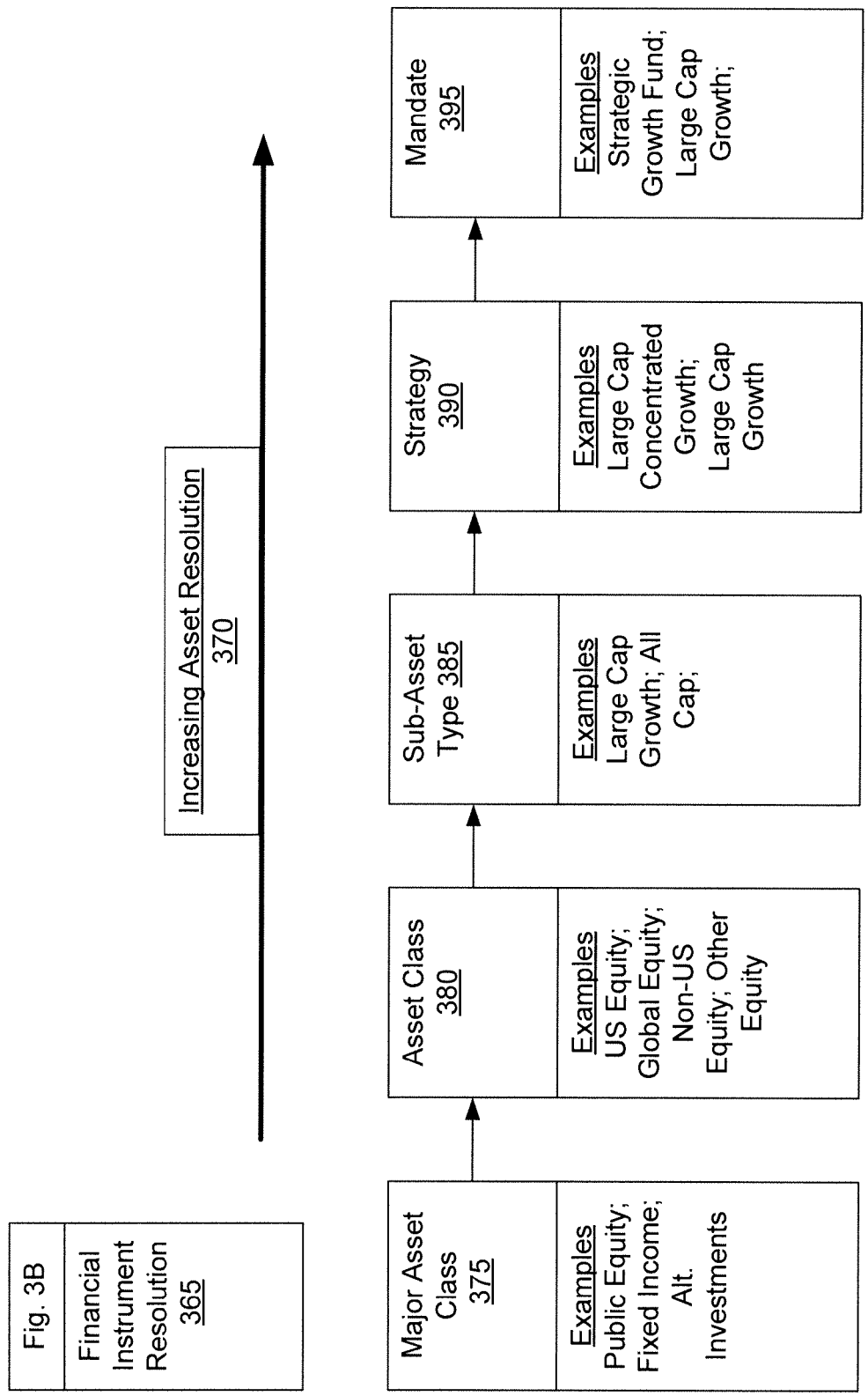

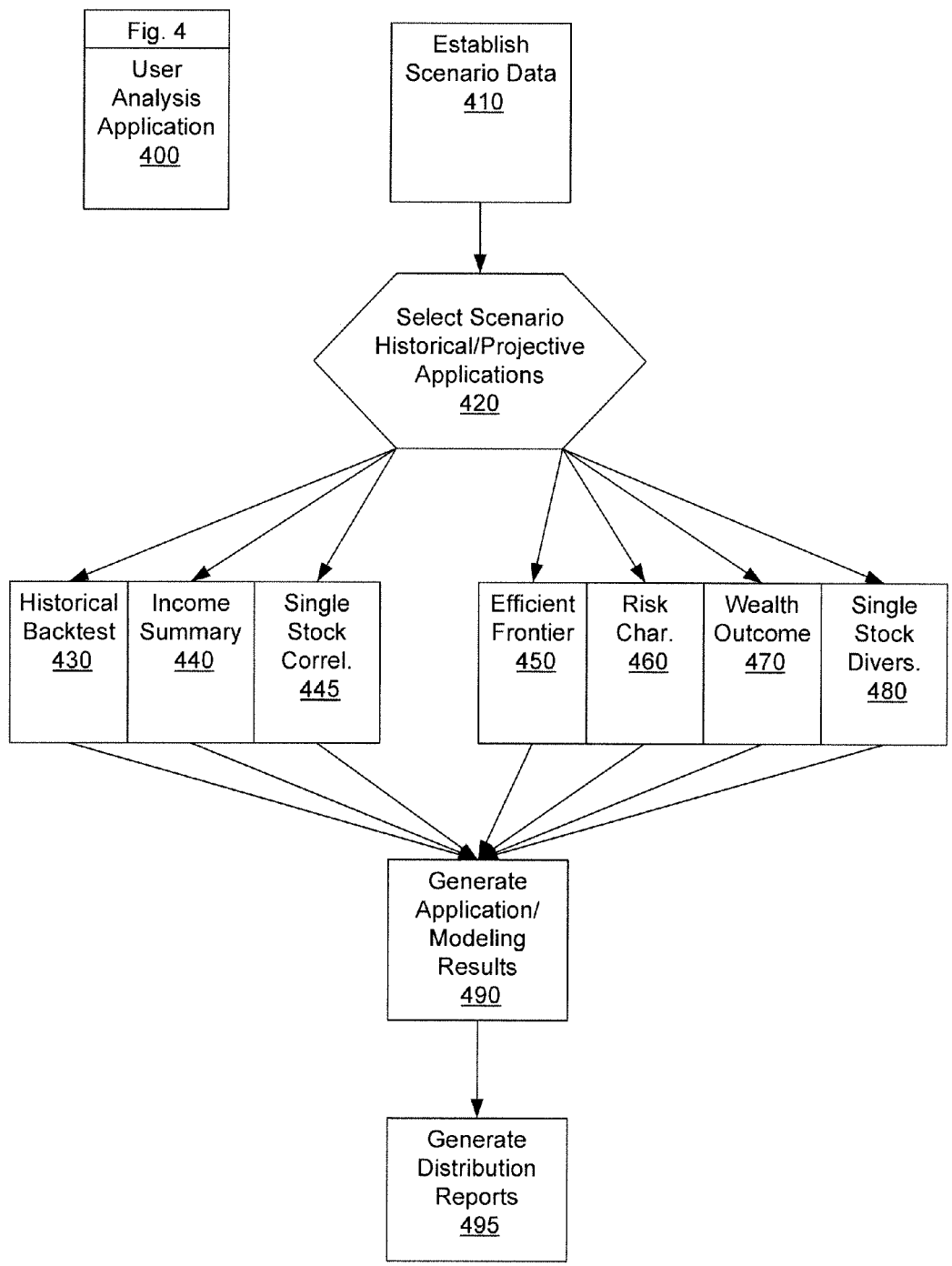

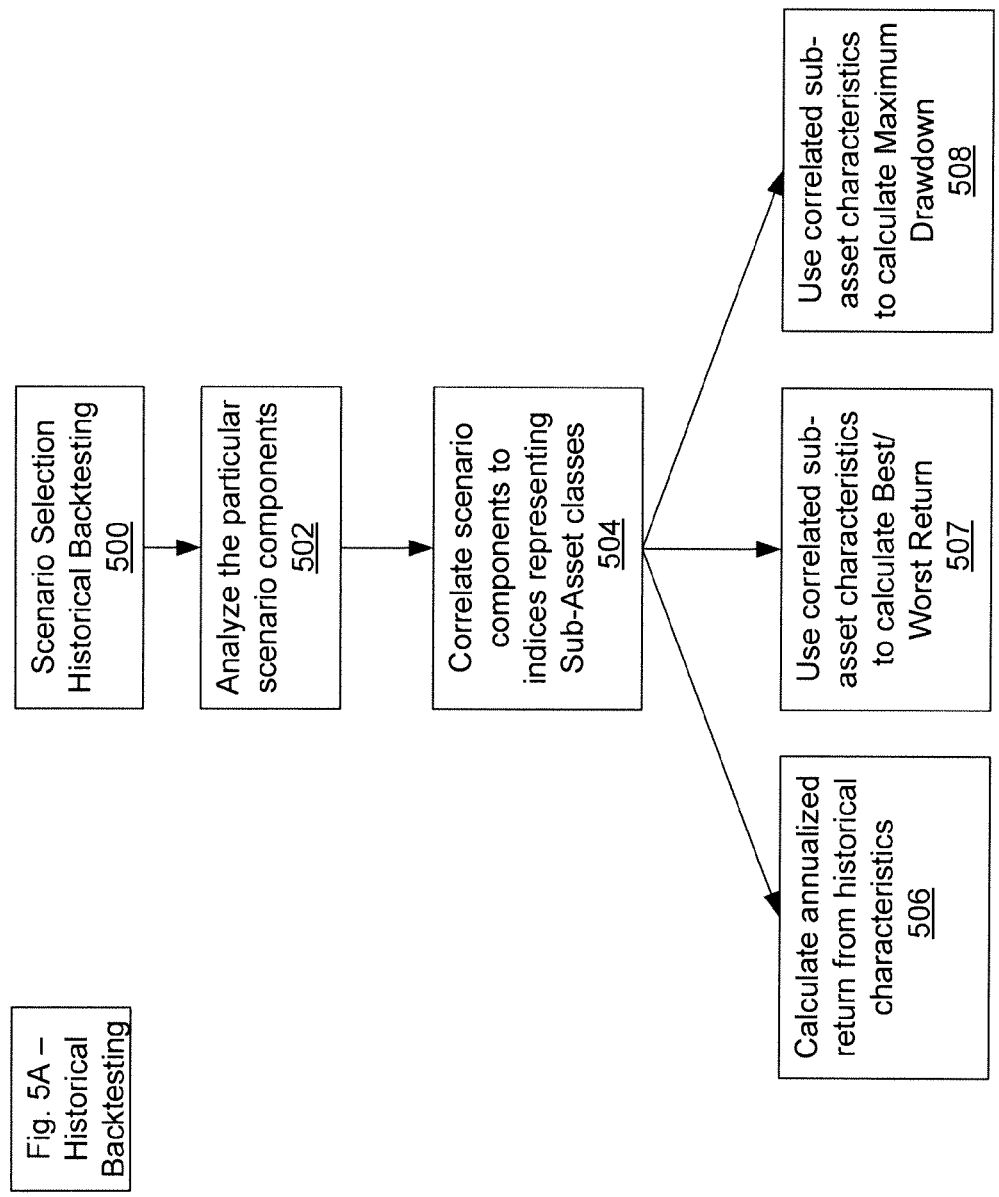
Fig. 5A – Historical Backtesting

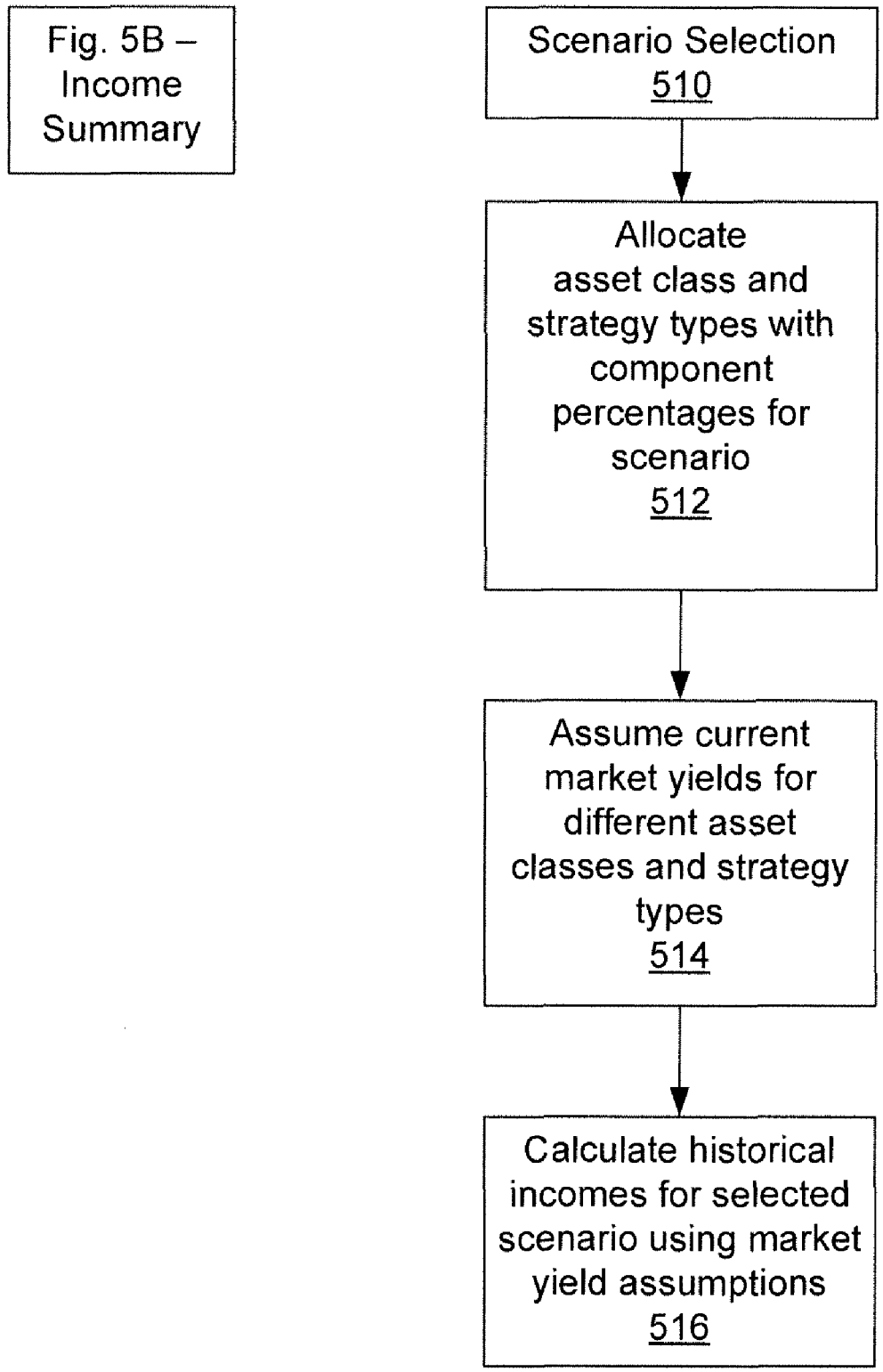

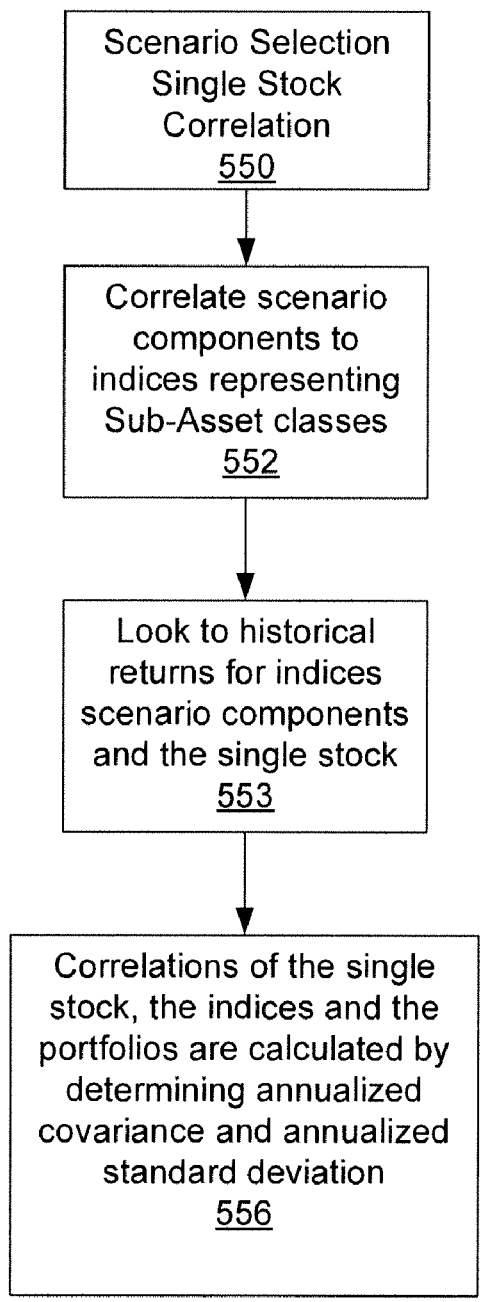

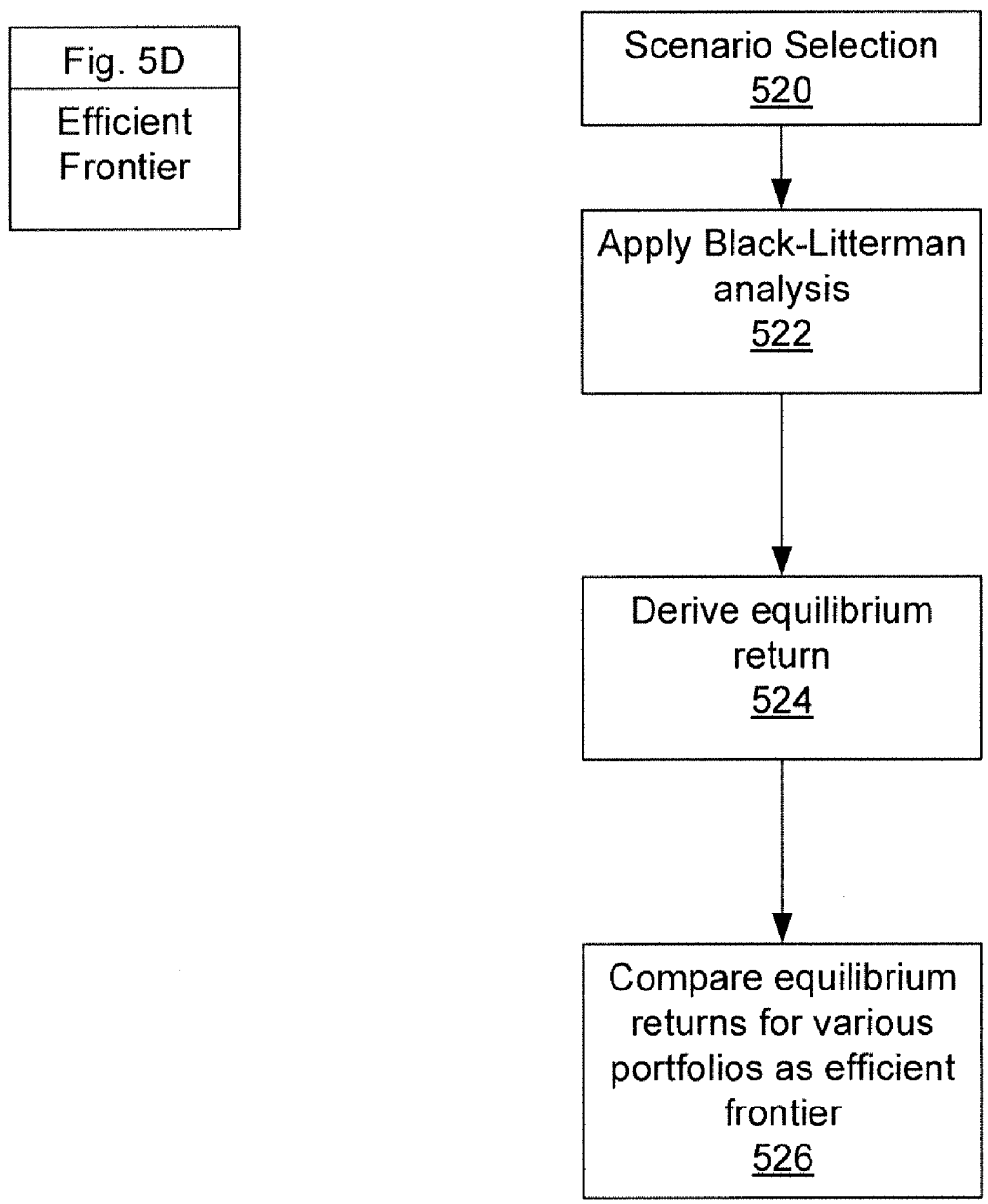

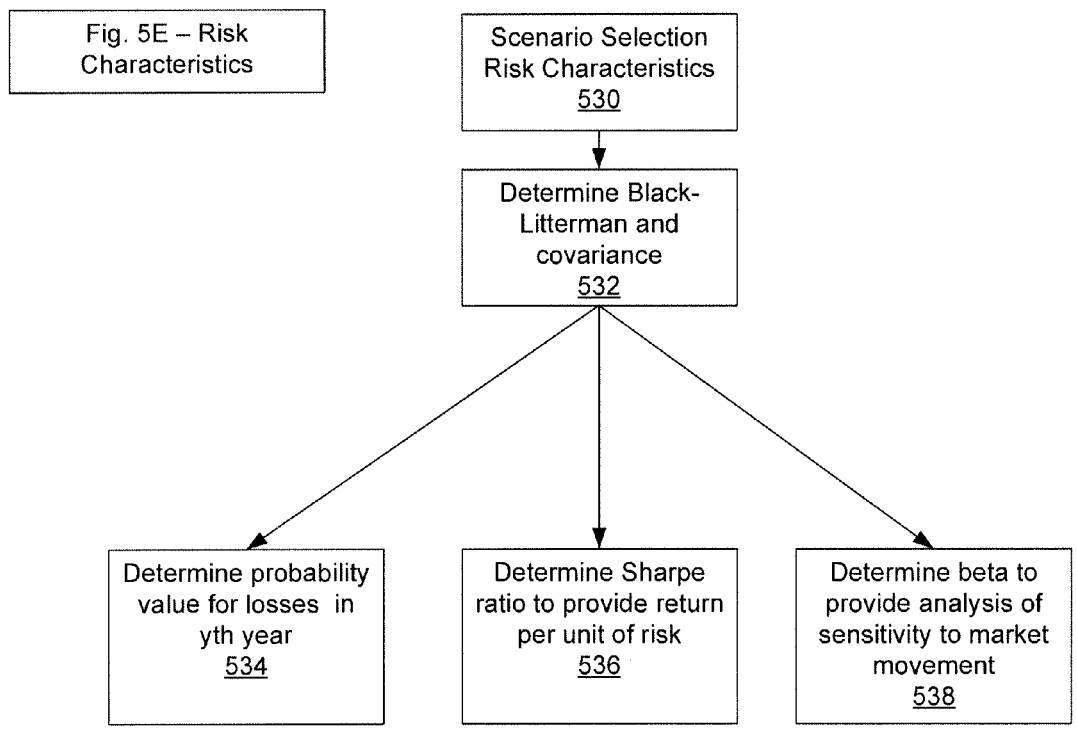

Fig. 5F – Wealth Outcome

```
Scenario Selection
Wealth Outcome
540
        │
        ▼
Divide assets into
relative buckets
542
        │
        ▼
Calculate covariance,
returns, income
turnovers, short term
gains, long term gains
and tax rates for
buckets
544
        │
        ▼
Generate simulated
returns
546
        │
        ▼
Calculate yearly
portfolio values
548
```

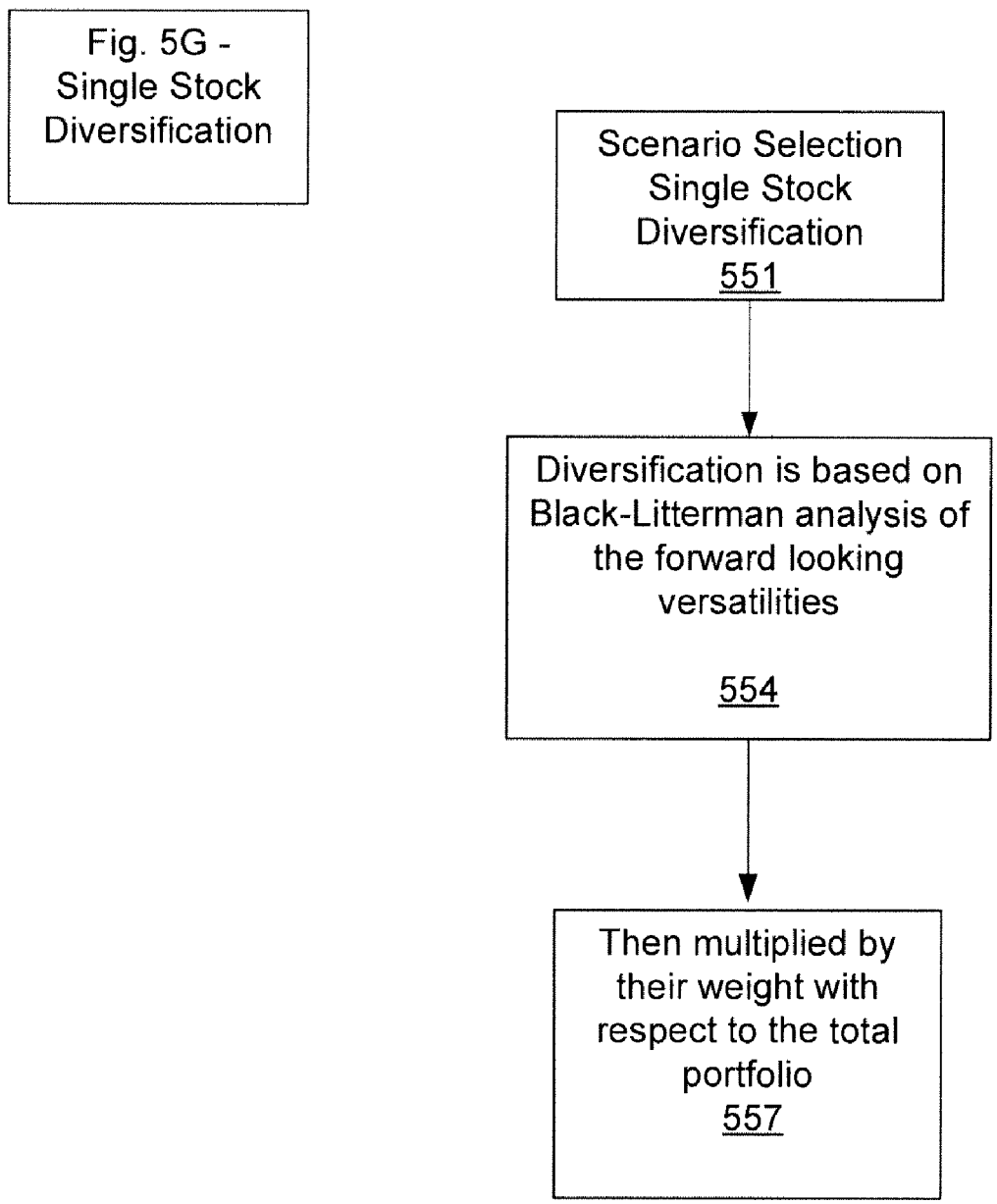

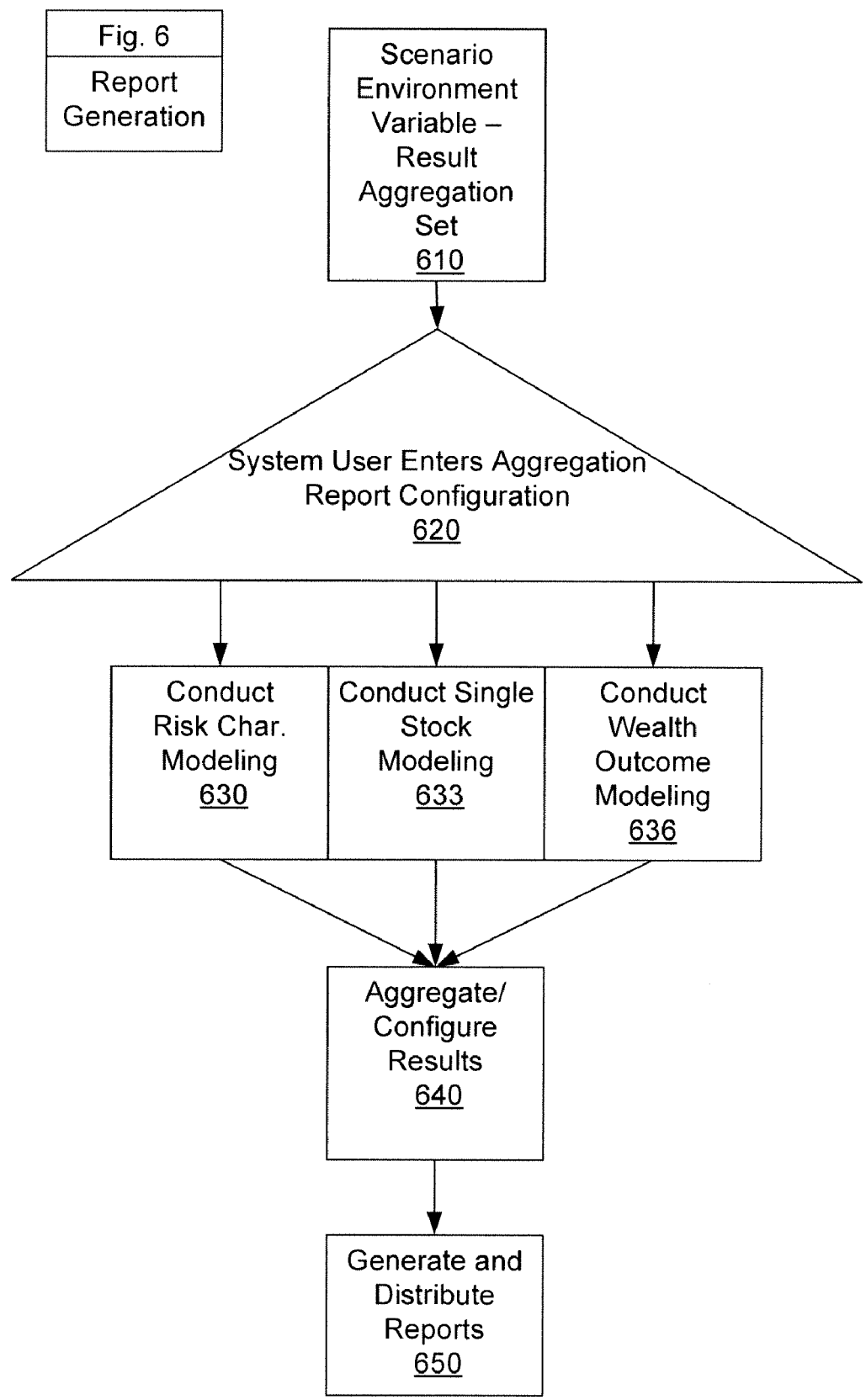

METHOD, SYSTEM AND APPARATUS FOR WEALTH MANAGEMENT

RELATED APPLICATIONS

This application is a continuation of and hereby claims priority to, pending U.S. patent application Ser. No. 11/610,383, entitled "Method, System and Apparatus for Wealth Management," filed on Dec. 13, 2006, which in turn is a continuation of, and claims priority to U.S. patent application Ser. No. 11/609,876, entitled "Method, System and Apparatus for Wealth Management," filed Dec. 12, 2006, all of which are incorporated herein in their entirety by reference.

FIELD

The present invention is directed generally to apparatuses, methods, and systems for modeling and analyzing financial instruments, and more particularly, to an apparatus, method and system for facilitating historical and projective financial modeling/analysis of portfolio asset allocations.

BACKGROUND

Conventionally, financial managers spend a great deal of time and energy managing/modeling/analyzing financial data to determine an investment strategy. Diversification of assets plays a critical role in balancing a portfolio as part of any such strategy. More particularly, a financial manager often attempts to distribute assets among a series of investments that have a range of financial characteristics. By investing in a broad range of financial instruments, a financial manager can optimize a particular portfolio by including instruments that vary in both risk and reward characteristics, in order to minimize risk exposure, and maximize the return on investment.

There are conventional management tools that attempt to facilitate the financial analysis and management of investments. However, the diverse range of financial investment instruments available to a financial manager can be extremely difficult to effectively track, analyze and model. Accordingly, significant improvements in providing financial data management functionality, processing, as well as analyzing/modeling functionality would enhance a financial manager's ability to effectively manage particular accounts, portfolios, and/or assets. Accordingly, such a system enables a financial manager to maximize investment returns, as well as minimize investment risks for a particular allocation of financial instruments.

SUMMARY OF THE INVENTION

The disclosure details implementations associated with apparatuses, methods, and systems directed to wealth management tools that effectively improve financial modeling/analysis capabilities, within an enhanced data analysis context. An implementation of the system is configured as an Asset/Portfolio Management System ("APMS"). The APMS enables a financial manager to manage financial data and efficiently conduct modeling/analysis on the financial data based on the manager's particular needs.

In an implementation, the financial manager creates test financial instrument allocations that are based on individual financial instruments and their corresponding financial characteristics. As such, the financial manager is able to balance investments in high risk/high return instruments with investments in instruments with more conservative risk/reward characteristics. According to an embodiment of the APMS, a financial manager (system user) manages a series of accounts, wherein each account corresponds to one or more financial instrument allocations or portfolios. The instrument allocation(s) may be based on a user's actual financial holdings, a hypothetical allocation and/or some combination of actual/hypothetical holdings. For each account, the manager is able to create, analyze and model financial data associated with at least one scenario.

A scenario includes an allocation listing of various portfolio or asset components, in addition to one or more financial analysis control variables that facilitate analysis/modeling. The scenario variables may be based on a user's financial data and/or on internally developed financial data (i.e., a financial manager's company may utilize the APMS to develop, analyze, model and maintain, a series of baseline scenarios or allocations). Alternately, it is to be understood that baseline scenarios may be developed and maintained by an external entity, acquired by the financial manager, and incorporated into the APMS.

According to an embodiment, a scenario includes two sets of financial data variables: scenario control variables and scenario component data. Scenario control variables generally include variables used to establish the control parameters for financial data processing/modeling/analysis, whereas component data includes a listing of the financial instruments and their respective characteristics included as a test allocation for financial data processing/modeling/analysis.

In an implementation, the system provides tools a system user can use to quickly and conveniently access data associated with their current financial assets, as well as supplement stored asset information with new/modified asset data. In an implementation, the system includes scenario component management modules that enable a system user to upload/port their portfolio data directly into the system. Alternately, the system may be configured to facilitate an interactive data entry method, wherein the system user selects the financial instruments to create an allocation from a financial instrument database.

Another aspect of the implementation involves system analysis modules that facilitate user analysis and/or modeling of financial instrument allocation scenarios. In an embodiment of the APMS, the system enables a financial manager to analyze or model an allocation of financial instruments as assets in a portfolio, while defining one or more control variables that define the context for the analysis. In an implementation, the scenario control variables may be used to facilitate historical analysis/modeling system modules. Alternately, or in addition to, the system control variables may enable a financial manager to analyze the allocation projectively—utilizing future-looking, predictive modeling/analysis modules. Accordingly, the APMS facilitates a financial manager's ability to review and analyze portfolio data over a system user-defined past, present or future time-frame. The system empowers a financial manager to manage asset data effectively, as well as customize scenario asset allocation(s) to meet their particular analysis/modeling needs.

In one implementation, a module receives portfolio asset allocation data and sets a target time period (with Z subperiods) for the analysis. The module associates each of the assets in the portfolio with one of the following tax characteristic groups: income not taxed group, income taxed at the income tax rate group and income taxed at the capital gains tax rate group, and in a further embodiment, a group containing assets taxed according to another taxing rule. The module determines the covariances between the groups and uses the covariances to generate N sets of dependent random variables for each Z subperiod, where the generated N sets of dependent random variables provide a simulated performance of the groups for the subperiod. The module computes the N simulated portfolio values for the groups for each Z subperiod using the values from the previous subperiod to calculate the realized gains, accounts for spending and any resulting taxes, rebalances the groups, and accounts for the tax implications of rebalancing. In further embodiments, the simulated portfolio values may include returns, incomes, turnovers, short term gains, and/or long term gains. Additionally, inflation, inflows and outflows may be accounted for in calculating the simulated portfolio values.

In an implementation of the APMS, the system is configured to aggregate the results from the modeling/analysis system modules and generate a distribution report. The financial manager can select from a broad variety of modeling/analysis report results and formats for the aggregate report. For example, in an embodiment of the invention, the report generation system module presents the system user with an interactive checklist of various model/analytic results that may be included in a distribution report. Furthermore, the module may be configured to generate the report in a number of formats that are easily reviewed and/or distributed (e.g., reports may be configured in graphical or textual formats).

In summary, APMS system modules can be described with respect to three core aspects—scenario creation/management; scenario processing, modeling, and analysis; and scenario report generation. Different implementations of the system may be customized to include or exclude various system components based on the needs of a particular system user. Furthermore, although the system user is described as a financial manager, it is to be understood that alternate embodiments may be adapted to meet the needs of other system users. Accordingly, the system provides a financial manager with significant flexibility, as well as substantial resources to efficiently and effectively manage, model, and analyze one or more asset allocation(s) within a user-defined context.

BRIEF DESCRIPTION OF THE DRAWINGS

The accompanying drawings illustrate various non-limiting, example, inventive aspects in accordance with the present disclosure:

FIG. 2 of the present disclosure illustrates a high-level flow diagram of a system user's interaction with the system according to an embodiment of the invention;

FIGS. 3A-3B of the present disclosure illustrate a flow diagram, and a system resolution diagram, respectively; each diagram is associated with a system user establishing scenario data in preparation for scenario processing/modeling/analysis according to an embodiment of the invention;

FIG. 4 of the present disclosure illustrates a flow diagram associated with a system user utilizing APMS tools for selecting modeling/analysis tools according to an embodiment of the invention;

FIGS. 5A-5G illustrate aspects associated with modeling/analysis modules of the present disclosure that are available for a financial manager using the APMS;

FIG. 6 illustrates a high-level flow diagram of a scenario modeling/analysis result aggregation and report generation process, according to an embodiment of the invention;

The leading number of each reference number within the drawings indicates the figure in which that reference number is introduced and/or detailed. As such, reference number 101 is first introduced in FIG. 1. Reference number 201 is introduced in FIG. 2, etc.

DETAILED DESCRIPTION

The Asset/Portfolio Management System (APMS)

Figure 1:
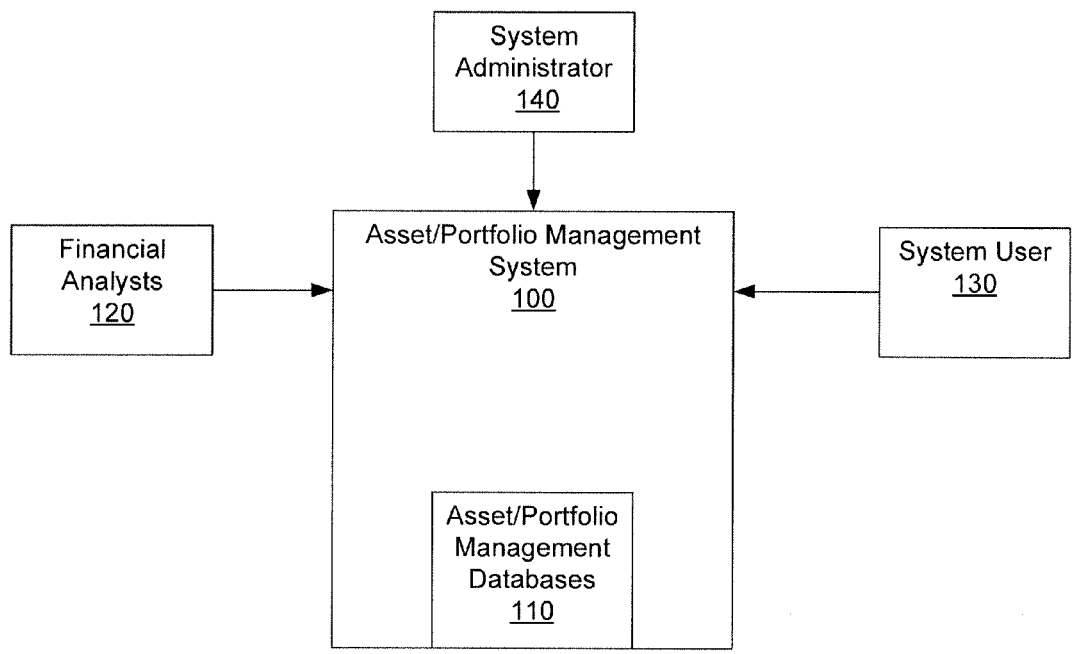
FIG. 1 of the present disclosure illustrates a high-level diagram illustrating the entities that interact with the system according to an embodiment of the invention.
Figure 7:
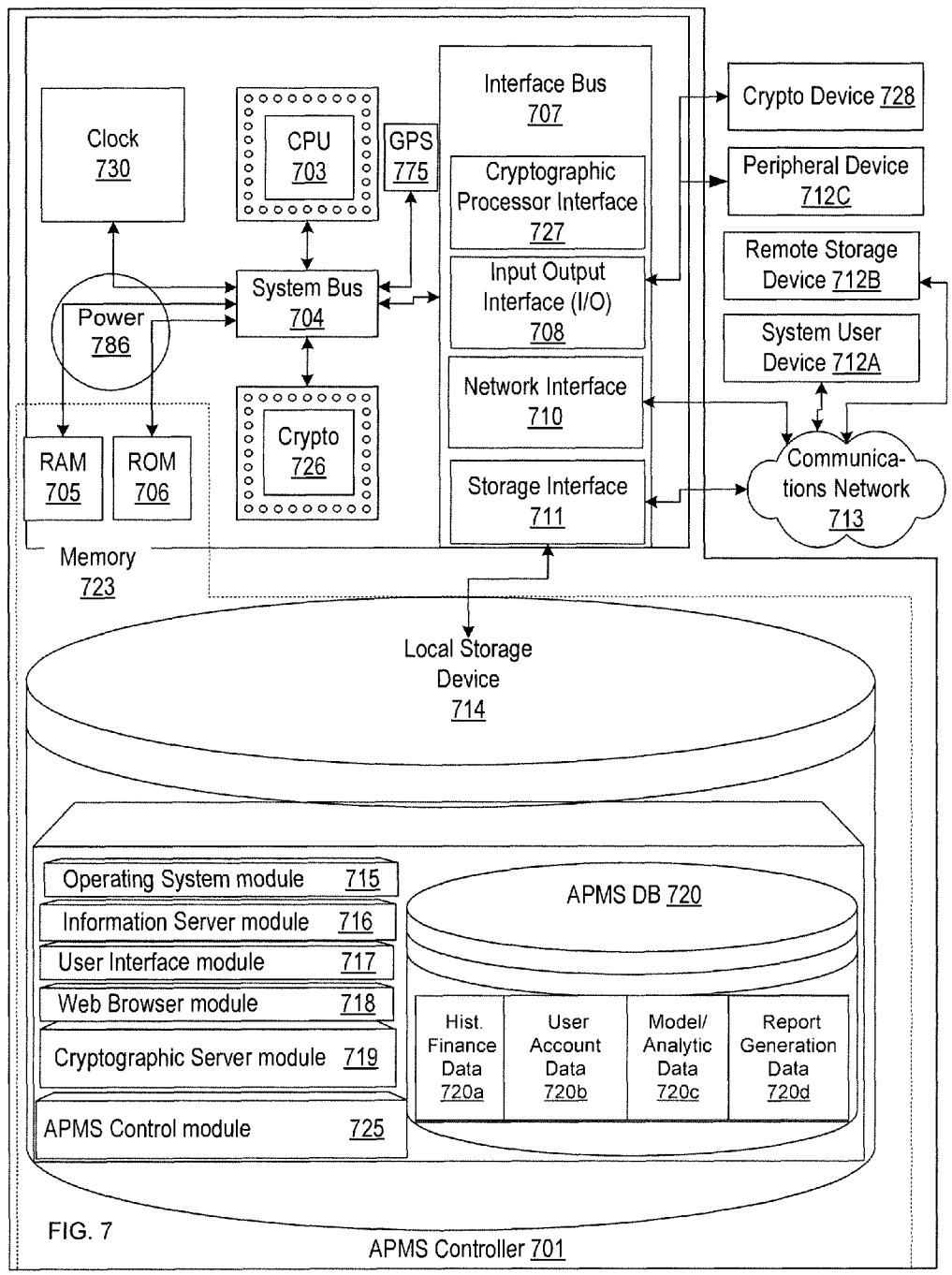
FIG. 7 illustrates system modules/components of an APMS controller in a block diagram, according to an embodiment of the invention.

FIG. 1 illustrates a high-level view of entities involved with an APMS, according to an implementation of the invention. By way of example only, the core APMS includes a central systemization component 100 with corresponding system databases 110 (a possible implementation of an APMS controller is illustrated in FIG. 7 and discussed in greater detail below). The system databases are populated with financial data generated by financial analysts 120 (or in some implementations by system user 130). Also, system user asset data may be uploaded/created by the system user 130 and/or correlated by a system administrator 140.

As will be described in greater detail below, the system user (generally, a financial manager) 130 can automatically or manually populate/update asset data associated with a particular logon/user account. In some embodiments, the APMS is configured so that the system user can effectively manage a series of user accounts (and corresponding asset allocations or scenarios). Alternately, the system administrator 140, may create and maintain system database 110 providing a substantial resource of current and/or historic financial data resources for system users 130 to use in scenario modeling and analysis. Such financial resources may be created by the system administrator 140 or created with the assistance of external financial analysts' 120 resources in populating system databases 110.

Furthermore, system administrators 140 may access the system to supplement/manage a series of scenario modeling/analysis modules (as described below) provided to a system user 130. Advantageously, it is to be understood that in an embodiment of the invention, the APMS system 100 is configured with a series of interchangeable scenario modeling/analysis modules, which may be individually configured to meet the needs of a particular system user 130. Also, the system analysis/modeling elements may be configured as system modules, so that as new/additional analysis/modeling tools are developed, a system administrator may incorporate the tools as part of the APMS.

FIG. 2 illustrates a high-level flow diagram of basic system user 200 interaction with the APMS according to an embodiment of the invention. In an implementation, a system user interacts with three primary system components in conducting financial modeling/analysis with the APMS.

The first system component 210 involves the system user creating and maintaining user financial asset data associated with an account 210. In some embodiments of the invention, a system user effectively manages a series of accounts (and possibly a series of corresponding scenarios) associated with various clients. Alternately, the APMS may be configured to provide processing/modeling/analysis functionality for an individual system user to manage their own investments. Further, depending on the system user's particular needs, the APMS may include a series of baseline scenarios created by a third party for use with a system user's account. As such, the system user is able to actively compare a series of scenarios while changing asset component allocations (or other scenario information).

The first system component 210 also involves creating one or more scenarios that will be used as the inputs to APMS modeling/analysis tools (described in greater detail below).

In an implementation, the system user creates a scenario in order to evaluate how a particular set of assets, or a portfolio, will perform in light of a particular set of financial environmental characteristics (e.g. during periods of low interest rates or high inflation).

After second system component 220 applies APMS analytical/modeling tools to a scenario, the third system component 230 facilitates report generation and distribution based on formatting and distribution variables designated by a system user (described in greater detail in FIG. 6).

FIG. 3A illustrates a flow diagram associated with first and second system components 210/220 (from FIG. 2). The first system component 210 involves establishing user asset data and creating one or more test scenario(s) for processing/modeling/analysis as part of the second system component 220. As illustrated in the FIG. 3A flow diagram, after the system user logs onto the APMS system in step 310, the system user is presented with an opportunity to upload, manage or supplement user asset data in step 320.

It is to be understood that the system user may be presented with several options for uploading, supplementing or managing user asset data. In an online embodiment of the invention, the APMS may be configured with a series of interactive web pages that present a system user with a series of questions directed to obtaining information about the user's financial assets. In one implementation, the system user answers the questions by selecting pre-configured portfolio component data that corresponds to financial instruments or assets currently held by the system user. In another implementation, the assets may be entered as a text listing of the financial instruments, as well as the corresponding quantity and/or value of each instrument. Once the system user's particular asset holdings have been entered into the system, the system user is given the opportunity to create a scenario.

In an implementation, the APMS may be configured with an interactive scenario component creation module. The system user is presented with a series of interactive component listings that enable the user to select instruments that they want to incorporate into the test scenario in step 330. The system user may select assets from system listings or alternately upload a pre-configured asset listing into the system database. In populating the test scenario with financial instruments, the system user may select components from their uploaded asset holdings. Also, the system may incorporate financial instruments selected from system databases. Advantageously, the system user may analyze/model a scenario that is based entirely on the asset holdings. Alternately, the system user may incorporate one or more instruments selected form the system database in order to influence a particular characteristic associated with their holdings (e.g., a system user with a relatively conservative set of assets, may incorporate financial instruments from the system database with much higher volatility characteristics to create more balanced test scenario.)

The system database 110 is maintained by system administrators to provide an extensive resource of financial instruments that are available for system users to incorporate into their asset listings. Once the baseline asset listings are established for a particular account, the system user may transition into scenario creation or scenario management modules. Additional system packets of financial instruments may be managed and prepared by a system administrator and provided for the system user to incorporate into a test scenario. As discussed briefly above, the scenario is a user-determined set of assets that are the subject of the AMPS analysis/modeling functionality.

Accordingly, the system user establishes two primary scenario data elements in step 330 and 340 in order to create a scenario for use in the system modeling/analysis in steps 350, 360. More specifically, the two primary scenario data elements include scenario component data and scenario control variables. Generally, scenario component data includes data such listings of particular assets held within a portfolio.

The APMS provides a great deal of flexibility in creating scenario component data. For example, it is to be understood that the system user may select all of the assets associated with an account as the basis for a test scenario. Alternately, the system user may select a specific subset of their assets as the basis of the test scenario. In some implementations, the system user may combine selected assets from their specific holdings with financial instruments selected from system databases to, analyze or model how particular combinations of assets would perform under certain financial environmental characteristics.

Scenario control variables are used to establish and facilitate the financial parameters that are used in the analysis/modeling conducted for scenario processing. Packages of scenario control variables may be established by system administrators based on historical financial events. For example, in conducting a historical analysis, a system user may want a package of control variables based on a previous 10 year period or a package that models a duration of time associated with high inflation rates.

In some implementations, the system user may modify individual control variables within a package. For example, assuming the user selects a package of control variables associated with a 20 year period of time with cash inflows or outflows of 3.5% for the first 5 years, the user may want to test the scenario component data for the same 20 year period but with cash inflows and outflows of 5.5% for the first five years, while maintaining all of the other controls variables at their assigned values for the selected period of time. The system user may save the various modified scenario control data to create customized scenario control variable packages for use in subsequent analysis/modeling.

Instead of using scenario control variable packages, the system may allow a system user to select which individual control variables will be used, and set the values for the respective control variables. Advantageously, the system may empower a system user to save and manage customized system user scenario control variable packages (or entire scenarios) for subsequent testing. For example, the system user can control a series of outflows by manipulating tax related data, such as the tax-status, an income tax rate, and/or a capital gains tax rate. The system user may also establish a risk tolerance ratio (i.e., the ratio of equity % to fixed income % components within a portfolio).

Another aspect of the system related to the scenario component variables involves the ability to create an expansive asset map (as illustrated in FIG. 3B) based on the component assets associated with a given scenario. The Expansive Asset (EA) map facilitates a visual overview of how the individual instrument/assets within a scenario are distributed. Further, the EA maps enable the user to visualize asset distribution characteristics across a user-adjustable resolution. In the example of the EA map illustrated in FIG. 3B, a user is able to see the types of financial instruments included within a particular scenario across a range of resolutions.

The EA map is generated as a two-dimensional grid with a vertical and horizontal axis, respectively. In FIG. 3B, the scenario components are displayed within as series of resolution classes with the components of a particular class displayed in along a vertical axis. The vertical component listings increase in resolution along arrow 370 and include component classes: Major Asset class 375; Asset class 380; Strategy Type class 385; Strategy class 390; and Mandate class 390.

According to an embodiment of the invention, the resolution may vary from a coarse major-asset class 375 to a high-resolution selection individual mandate class 395. For example, in an embodiment of the APMS the following are possible resolutions and include examples of financial classes/instruments corresponding to the particular resolution.

Major Asset Class 375—examples include public equity instruments; fixed income instruments; alternative investments Asset Class 380—US equity instruments; global equity instruments; non-US equity instruments; other equity instruments Sub Asset Class 385—large cap growth; small cap value; all cap;

Strategy 390—large cap concentrated growth; large cap growth or default asset classification strategy (US stocks)

Mandate Class 395—selected equities from a strategic growth fund; selected equities from a large cap Growth account or a default asset classification.

These component class resolution groups vary with increasing resolution along arrow 370 from a coarse high-level class (Major Asset class 375) to a granular high-resolution class (Mandate class 395).

Although, the system conducts Black/Litterman analysis based on a scenario component characteristic with a Sub-Asset type resolution, the user inherently determines Sub-Asset scenario characteristics based on the individual instruments included as the scenario component variables discussed above. For example, if a user adds a significant portion of IBM stock to their asset holding and incorporates the position as a scenario component variable, the user is effectively increasing the percentage of Large Cap Growth equities within the test scenario. Accordingly, a series of correlations are used to factor this increased position into the Black-Litterman analysis conducted on the scenario at the Sub-Asset type resolution class.

Additional examples of scenario control variables include financial environmental characteristic, such as a user-identified scenario analysis base region, a base currency, and/or scenario tax status information. It is to be understood that scenario control variables may also include any other number of control variables that effectuate additional analysis/modeling and may include variables related to comparison scenario analysis/modeling results and/or data aggregation control variables that facilitate scenario result generation and distribution of a scenario results report.

Depending on the particular system user's needs, the system may be configured with a scenario result aggregation module. In an implementation, the aggregation module may be used by a system user to compare certain analysis/modeling results after one or more scenarios have been tested. This implementation may be further configured to include pre-configured scenarios and the corresponding scenario test results. For example, the system administrator may create and maintain standardized model scenarios as baselines for comparison with the system user's customized test scenarios (e.g., the system administrator may create conservative, moderate and/or aggressive baseline scenarios).

Once the primary scenario data elements are established, the system proceeds with a user-specified modeling/analysis application step 350 and a scenario processing step 355. The processing/modeling/analysis steps 350, 355 are followed by the scenario report generation step 360.

FIG. 4 illustrates the APMS scenario data processing/modeling/analysis module selection process element 220 from FIG. 2. The system user establishes the scenario data in step 410 (as described in FIG. 3A) and enters the historical/prospective modeling and analysis selection step in 420.

There are several elements necessary to conduct scenario modeling/analysis, such as forward-looking hypothetical assumptions for returns, volatilities and correlations associated with the various scenario resolution classes. The volatility and correlation data may be derived from historical data analysis, such as the Stambaugh Method. However, it is noted that historical mean returns are an unreliable basis for determining forward looking expected return assumptions. Accordingly, a Black-Litterman model provides a better solution for processing scenario data and deriving expected returns.

Implementing the Black-Litterman model effectively necessitates implementing a few basic assumptions as part of the modeling analysis process. For example, the Black-Litterman model assumes the existence of a risk free asset, such as cash. Also, application of the model results in asset returns that are generally expressed as excess returns over the risk free rate rather than absolute returns. Once these issues have been addressed, the APMS implements processing associated with constructing and processing a covariance matrix that is based on derived historical volatilities/correlations, as well as a baseline portfolio allocation. According to an embodiment of the invention, the baseline allocation may be implemented based on market cap weights or some other baseline as determined by the system administrator.

As shown in FIG. 4, the APMS provides a series of historical and projective financial modeling/analysis modules (430-490) that apply Black-Litterman processing to the scenario variable data discussed above. In order to provide a context for the discussing the modeling/analysis modules, it is helpful to discuss an example application of the Black-Litterman model. Accordingly, by way of example only, an initial aspect of the process involves historical analysis to develop factors for the Covariance, Correlation and Standard Deviation associated with particular scenario component assets. For the purposes of illustration, the financial processing is discussed in the context of a portfolio comprising a risk free asset (Cash) and three "risky" asset classes (USFI, USEQ, and NUSEQ).

Assuming for the purposes of illustration that the risk free asset has zero volatility and that for the three "risky asset classes" the following covariance and correlation matrices are established:

| Covariance | USFI | USEQ | NUSEQ |
|---|---|---|---|
| USFI | 75.00 | 84.04 | 75.85 |
| USEQ | 84.04 | 277.78 | 223.29 |
| NUSEQ | 75.85 | 223.29 | 351.13 | where the "risky asset classes" have the following Standard Deviation:

| Standard Deviation | |
|---|---|
| USFI | 8.66 |
| USEQ | 16.67 |
| NUSEQ | 18.74 |

| Correlation | USFI | USEQ | NUSEQ |
|---|---|---|---|
| USFI | 1.0 | 0.58 | 0.47 |
| USEQ | 0.58 | 1.0 | 0.71 |
| NUSEQ | 0.47 | 0.71 | 1.0 |

Also, for the purposes of analysis the processed portfolio has the following asset allocation:

$$w_{CASH}=5\%; w_{USFI}=25\%; w_{USEQ}=50\%; w_{NUSEQ}=20\%$$

Once these values are established, the following generalized equations can be applied:

| Excess Return | Weight | Excess Mean |
|---|---|---|
| $r_{USFI}$ | $w_{USFI}$ | $\mu_{USFI}$ |
| $r_{USEQ}$ | $w_{USEQ}$ | $\mu_{USEQ}$ |
| $r_{NUSEQ}$ | $w_{NUSEQ}$ | $\mu_{NUSEQ}$ |

| Covariance Matrix of Excess Returns | | |
|---|---|---|
| $\sigma^2_{USFI}$ | $\sigma_{USFI,USEQ}$ | $\sigma_{USFI,NUSEQ}$ |
| $\sigma_{USFI,USEQ}$ | $\sigma^2_{USEQ}$ | $\sigma_{USEQ,NUSEQ}$ |
| $\sigma_{USFI,NUSEQ}$ | $\sigma_{USEQ,NUSEQ}$ | $\sigma^2_{NUSEQ}$ |

Therefore, the formulas for the scenario portfolio mean and variance can be expressed using matrix notation as:

$$\mu_P = \begin{pmatrix} w_{USFI} & w_{USEQ} & w_{NUSEQ} \end{pmatrix} \begin{pmatrix} \mu_{USFI} \\ \mu_{USEQ} \\ \mu_{NUSEQ} \end{pmatrix}$$

$$\sigma_P^2 = \begin{pmatrix} w_{USFI} & w_{USEQ} & w_{NUSEQ} \end{pmatrix} \begin{pmatrix} \sigma^2_{USFI} & \sigma_{USFI,USEQ} & \sigma_{USFI,NUSEQ} \\ \sigma_{USFI,USEQ} & \sigma^2_{USEQ} & \sigma_{USEQ,NUSEQ} \\ \sigma_{USFI,NUSEQ} & \sigma_{USEQ,NUSEQ} & \sigma^2_{NUSEQ} \end{pmatrix} \begin{pmatrix} \mu_{USFI} \\ \mu_{USEQ} \\ \mu_{NUSEQ} \end{pmatrix}$$

The respective matrices can be simplified as:

$$\mu_p = w^t \mu$$

$$\sigma_p^2 = w^t \Sigma w$$

(where w is the weight vector, $\mu$ the mean return vector, $\Sigma$ the covariance matrix, t denotes a transpose).

Accordingly, based on the mean-variance paradigm, the goal is to determine the set of scenario component (portfolio) weights w that effectively maximize the objective function:

$$w^t \mu - \frac{\delta}{2} w^t \Sigma w$$

In this objective function, the expression for the portfolio mean ($w^t_\mu$) has a positive sign, indicating that it is beneficial to have portfolios with higher returns. In contrast, the portfolio variance term ($-\delta/2\ w^t\Sigma w$) has a negative sign in front of the term and as such, penalizes volatility. In order to maximize the objective function and determine a "risk aversion parameter" 18. Increasing $\delta$ results in a higher penalty for portfolio variance. Therefore, an optimal portfolio will have a lower volatility. The equations are optimized to produce the following linear equation for the optimal portfolio:

$$\delta \Sigma w = \mu$$

In applying the model to the issues at hand, it is possible to conduct a reverse analysis starting with a baseline scenario allocation and deriving a consistent set of mean excess returns by calculating:

$$\mu = \delta \Sigma w$$

For the purposes of illustration, the baseline portfolio is implemented as a global market portfolio. The set of mean excess returns is well defined up to a scalar, which is determined by a particular user's risk aversion metric ($\delta$). According to some embodiments the risk aversion parameter is selected to meet a particular targeted risk premium. As discussed above, there are a series of correlations/assumptions that are made based on historical financial data in order to implement portfolio processing.

Application of the Initial Portfolio Processing

FIGS. 5A-5G illustrate the process of a system user conducting modeling/analysis for a particular scenario in applying the Black Litterman processing discussed above. Depending on the implementation, a system user can model or analyze the portfolio data historically or projectively. The historical modules enable a system user to analyze or model how a particular scenario allocation would have performed under certain historical economic environments (e.g., periods of low interest rates and/or high inflation rates). Alternately, the system user may conduct forward-looking (projective) modeling/analysis.

FIG. 4 illustrates examples of some modeling/analysis modules (430-485) that the may be incorporated into various embodiments of the APMS. By way of example only, historical modeling/analysis system modules may include a historical back-testing module 430; and/or an income summary module 440. Examples of projective modeling/analysis modules include a an efficient frontier/portfolio optimization module 450; risk characteristic module 460; a wealth outcome model 470; and/or a single stock correlation/diversification module 480. It is to be understood that these modules are simply examples of different types of historical/projective modeling/analysis modules that may be included as components of the APMS based on the particular needs of a system user.

Historical Modeling/Analysis

Historical Backtesting 430

One of the historical scenario modeling/analysis modules is historical backtesting. The historical backtesting module enables a system user to model/analyze how their particular scenario component allocation would perform during a historical time period or economic cycle. For example, the system user could create a test scenario allocation that they believe would perform well in financial environments with high inflation rates. A system user may create an inflation resistant portfolio by selecting certain financial instruments to create a scenario. The system user can then determine how the inflation resistant portfolio would have performed (by reviewing scenario characteristics such as risk/reward characteristics) during a period of high inflation, such as during the late 1970s (1973-1982).

One embodiment for performing historical backtesting is shown in FIG. 5A. After the user designates the particular historical analytic period as a scenario control value 500, the processing for the modeling/analysis continues based on the system user's scenario designated component variables associated with a particular scenario 502. The next step correlates scenario components to indices representing sub-asset classes 504, which involves obtaining the historical returns for appropriate indices representing the scenario control variable (e.g., strategy types or sub-asset classes) for a particular scenario. It is then possible to use the returns to calculate various attributes associated with the historical portfolio, such as the annualized return 506, and the best or worst returns 507 over a particular time period (e.g., 12, 24, or 36 month time periods), and/or the maximum drawdowns 508. The maximum drawdown is the period of worst performance for a portfolio from peak to trough during a specified period of time. For example, a portfolio of $100 grows to $200; but before reaching $200, the maximum value of the portfolio was $250 and lowest $175—effectively a 30% trough or drawdown.

The system user has the option to compare: 1) how a particular allocation would perform over a series of different historical periods; and/or 2) the option to run several different asset allocations for the same historical period. Moreover, based on how the scenario environment variables are set by the system user, the backtesting results may be presented in either tabular or graphical formats. As will be discussed in greater detail below with regard to FIG. 6, the results of the backtesting may be incorporated into a full scenario modeling/analysis result aggregation report.

Income Summary 440

Another historical modeling/analysis module generates an income summary that compares the estimated income amounts for the current and recommended allocations. As shown in FIG. 5B, with a scenario selected 510, the estimated income for the current, recommended and model allocations may be determined, the asset class and strategy types (as scenario control variables) are allocated with a specific component percentage (e.g., 5% in Large Cap Growth etc.) within a system user defined scenario 512. Current market yields are assumed for the different asset classes and strategy types 514, where the yields are determined by a system administrator who correlates the asset class/strategy type, with a particular index or security (e.g., 3 month treasuries, the S&P 500 Index, and or Goldman Sachs High Yield Fund). With this information the historical incomes for the selected allocations are calculated 516.

Single Stock Correlations 445

One of the goals of scenario processing involves providing a system user with an enhanced understanding about the relationships (and correlations) between the various portfolio components. Accordingly, one of the historical modeling/analysis tools facilitates a dual prong approach to illustrating the interrelationship between an individual instrument (e.g. a single stock) and the other components of the portfolio.

As shown in FIG. 5C, after selecting a scenario 550, a table of correlation values 552 is developed. The historical returns for the indices and the single stock are used to determine the correlations 553. Correlations of the single stock, the indices and the portfolios are calculated by determining annualized covariance and annualized standard deviation 556.

This tool facilitates developing a matrix of correlation values associated with the individual instrument with regard to the other components of the portfolio. The correlations of the single stock with other indices are calculated using historical time series returns and computing the annualized covariance and their annualized standard deviations:

$12*\Sigma[(X_i-\mu_x)*(Y_i-\mu_y)]/(n-1)$      annualized covariance:

$12*\Sigma(X_i-\mu_x)^2/(n-1)$.      annualized standard deviation:

(MVO), which is a technique that determines the tradeoff between risk and return.

Prospective Modeling/Analysis

Efficient Frontier 450

The system user can apply the Black-Litterman modeling to a series of portfolios in order to determine a correlation between the risk/return characteristics for respective portfolios. As shown in FIG. 5D, in an embodiment of the invention, a scenario is selected 520 including a fourth scenario element as an additional scenario identifier. Black-Litterman modeling is applied to the selected scenario 522 where the additional scenario identifier lists additional user-defined or system-defined scenarios that can be utilized as baselines for comparison. The output from the Black-Litterman model 524 is an equilibrium return, which reflects the return of assets based on a combination of ideal financial environment condition and system administrator analysis. The equilibrium returns for each portfolio are compared graphically as an efficient frontier 526 (a curve on a risk-reward graph derived based on the equilibrium return value for each portfolio). The efficient frontier enables a system user to determine which particular portfolio allocation effectuates the greatest return, while minimizing a risk exposure characteristic. The efficient frontier is determined using Mean Variance Optimization Risk Characteristic 460

FIG. 5E shows another prospective modeling/analysis module, which involves determining forward looking expected returns and risk metrics. With a scenario selected 530, Black-Litterman return calculations and a covariance associated with a portfolio's asset classes are determined 532. From these initial determinations, it is possible to derive portfolio characteristics including, but not limited to, standard deviation events and/or the Sharpe ratio and beta. The system determines the $n^{th}$ standard deviation event, by calculating:

$$\mu+(n*\sigma).$$

A system user is provided with a probability value 534 for the loss in the $y^{th}$ year based on a normal distribution with $y*\mu$ as the mean and $\sqrt{(y)}*\sigma$ as the standard deviation and then determining the area under the curve for negative x.

Determining the Sharpe ratio 536 provides the system user with a measure of reward per unit of risk: $\mu$–"risk free rate"/$\sigma$. The beta determination 538 provides a system user with a metric that quantifies the relative sensitivity of a portfolio to broad market movements (e.g., movements within the S&P 500). The beta is determined by finding the covariance between the portfolio return and the market return and dividing by the variance of the market's return: $cov(Z_p, Z_m)/\sigma_m^2$.

It is to be understood, that the system user is able to establish scenario environment data so that the modeling/analysis associated with the risk characteristic determinations meet the needs of the system user. By way of example only, it is possible for a system user to establish how the results are generated (tabular, graphical or a combination of the two). It is also possible for the system user to conduct the risk characteristic analysis on additional portfolios, as well as establish the number of standard deviation events and the time frame for the probability of loss analysis.

Wealth Outcome Ranges 470

Another prospective modeling/analysis tool is a wealth outcome range module configured to predict what the estimated portfolio market value will be at a system user specified future time. The modeling/analysis module implements Monte Carlo simulations to estimate the value of a portfolio at some point in the future (Z years) based on a range of future variables, including: account fluctuations, inflation, saving/ spending, taxes and rebalancing. The wealth range results are generated for the $10^{th}$ percentile, the median, and the $90^{th}$ percentile estimations. To calculate the hypothetical future net worth, an initial amount of wealth is assumed, as well as future savings and spending needs. In some embodiments, savings and spending are adjusted for inflation when generating real wealth projections. Each year the amount of taxes that would have to be paid on the income and realized gains portions of the portfolio are deducted. At the end of each year, the portfolio is rebalanced to keep the initial weights of assets.

As shown in FIG. 5F, after a scenario is selected 540, the wealth outcome range calculations are based on four steps:
1) divide the assets into relative buckets 542;
2) calculate the covariance, returns, incomes turnovers, short term gains, long term gains, and tax rates for the buckets 544;
3) generate simulated returns 546;
4) calculate the yearly portfolio values based on the foregoing elements 548.

The first step involves dividing the assets into relative buckets or groups. The entire asset class schema (corresponding to the scenario control variables) is divided into four buckets based on similarities in how the assets are taxed. By way of example, bucket A might include tax free assets (i.e., municipals); bucket B includes income taxed at the capital gains (long term) rate (i.e., equities); bucket C includes income taxed at the income (short term) rate (i.e., fixed income); and bucket D includes income taxed at a combination of short and long term rates (i.e., hedge funds).

The second step uses expected volatilities to derive the weighted 4 by 4 covariance matrix of the buckets, $\Sigma_x$. The bucket returns, incomes, turnovers, short term gains, long term gains and tax rates are determined based on the relative weights of the assets in each bucket. While these values are calculated now in this embodiment for efficiency reasons, these calculations could be made later in the process without affecting the outcome.

The third step involves generating the simulated returns (N number of 4 by Z dependent random variables). The goal of this element is to generate dependent random variables representing the simulated returns of each bucket. Essentially this means generating a set of multivariate, dependent random variables with a specific $\mu$ and $\sigma$. This a three step process:
  a) Build the vector of mean returns from the 4 buckets;
  b) Use a Cholesky Decomposition to reduce the X covariance matrix to LU form.
  c) Iterate for N number of simulations desired;
    i) Generate a 4×Z matrix A of independent random variables from a standard, normal distribution;
    ii) Finally compute dependent matrices X=LA+Mx.

The fourth element takes the simulated returns and computes N simulated portfolio values for each year, for Z years. Accordingly, it is necessary to conduct additional calculations for each year:
  a) Start with the portfolio value from the previous year;
  b) Multiply by the simulated return for that year to give the ending market value;
  c) Calculate the income and realized gains (based on unrealized gains and turnover) for that year and the tax on that value;
  d) Calculate the unrealized gains and the portfolio after rebalancing;
  e) Include any savings or spending in that year, as well as the taxes paid;
  f) Adjust for inflation; and
  g) The ending result is carried as the starting value for the next year.

The vector of N ending portfolio values is sorted, with the $90^{th}$ percentile, the median, and the $10^{th}$ percentile may be reported to the system user. Accordingly, the wealth results may be reported in either a table or a graph. Furthermore, the wealth outcome ranges may be incorporated in the scenario modeling/analysis aggregation report.

In one embodiment, the module receives portfolio asset allocation data and sets a target time period (with Z subperiods) for the analysis. The module associates each of the assets in the portfolio with one of the following tax characteristic groups: income not taxed group, income taxed at the income tax rate group and income taxed at the capital gains tax rate group, and in a further embodiment, a group containing assets taxed according to another taxing rule. The module determines the covariances between the groups and uses the covariances to generate N sets of dependent random variables for each Z subperiod, where the generated N sets of dependent random variables provide a simulated performance of the groups for the subperiod. The module computes the N simulated portfolio values for the groups for each Z subperiod using the values from the previous subperiod to calculate the realized gains, accounts for any spending and any resulting taxes, rebalances the groups, and accounts for the tax implications of rebalancing. In further embodiments, the simulated portfolio values may include returns, incomes, turnovers, short term gains, and/or long term gains. Additionally, inflation, inflows and outflows may be accounted for in calculating the simulated portfolio values.

Single Stock Diversification 480

As stated above, one of the goals of scenario processing involves providing a system user with an enhanced understanding about the relationships (and correlations) between the various portfolio components. This information can be used by the diversification prospective modeling/analysis tools to identify the interrelationship between an individual instrument (e.g. a single stock) and the other components of the portfolio.

As shown in FIG. 5G, after selecting a scenario 551, the covariance of the single stock with other indices are calculated using Black-Litterman forward looking volatilities to determine whether to divest portions of the individual instrument from the portfolio. From this analysis diversification plans are developed 554.

The effect of diversification (reducing volatility) is based on the standard deviation—the standard deviation of each of the assets is computed including the diversified portion of the single stock and multiplied by their weights in the total portfolio. Based on this calculation it is also possible to generate a single stock diversification chart. A divestment plan for lowering volatility is created by factoring the portfolio weight of the security into the diversification analysis 557. If an individual instrument comprises a significant percentage of the portfolio, it may create unwanted and unnecessary risk exposure.

One solution to the unwanted and unnecessary risk exposure, involves incrementally liquidating the individual asset and re-investing the proceeds in diverse holdings—effectively re-balancing the portfolio to attain an optimized balance between risk and return on the investments. A system user is able to minimize adverse impact on the entire portfolio by incrementally liquidating the position in the individual instrument. Accordingly, the modeling/analysis module is configured to generate results that illustrate the benefits of divesting the position and obtaining a more balanced asset allocation. Generally, divesting the position effectively achieves a significant reduction in portfolio volatility.

Scenario Modeling/Analysis Result Aggregation

In an embodiment of the invention, the APMS is configured to aggregate the results from the various scenario processing/modeling/analyzing modules (430-480 from FIG. 4). As discussed with regard to FIG. 6, one of the scenario environment variables is the result aggregation/report generation indicator 610. If the indicator is set by the system user, the APMS presents the system user with a series of configuration variables in step 620. The configuration variables enable the system user to determine how the APMS generates and formats a modeling/analysis result aggregation report.

As the system user conducts the modeling/analysis, each modeling/analysis module can be configured to check whether the indicator has been set (630, 633 and 636). If the system user has set the indicator, the APMS modeling/analysis module transmits the modeling/analysis results to a report generation module.

Accordingly, when the system user is finished with modeling/analysis for a particular scenario, the APMS generates a summary report aggregating the various results 640. In an embodiment of the invention, the report generation module generates the report according to a system user specified format. For example, the report generation module may create a power point presentation aggregating the various scenario modeling/analysis results and automatically distribute (e.g., email) the report to a system user defined list of recipients, as in step 650.

Asset/Portfolio Management System Controller

FIG. 7 of the present disclosure illustrates inventive aspects of a Asset/Portfolio Management System controller 701 in a block diagram. In this embodiment, the APMS controller 701 may serve to process, store, search, serve, identify, instruct, generate, match, and/or update job postings, job applications, and/or other related data.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

In one embodiment, the APMS controller 701 may be connected to and/or communicate with entities such as, but not limited to: one or more users from user input devices 712A; peripheral devices 712C; a cryptographic processor device 728; and/or a communications network 713.

Networks are commonly thought to comprise the interconnection and interoperation of clients, servers, and intermediary nodes in a graph topology. It should be noted that the term "server" as used throughout this disclosure refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The APMS controller 701 may be based on common computer systems that may comprise, but are not limited to, components such as: a computer systemization 702 connected to memory 723.

Computer Systemization

A computer systemization may comprise a clock 730, central processing unit (CPU) 703, a read only memory (ROM) 706, a random access memory (RAM) 705, and/or an interface bus 707, and most frequently, although not necessarily, are all interconnected and/or communicating through a system bus 704. Optionally, the computer systemization may be connected to an internal power source 786. Optionally, a cryptographic processor 726 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium, Xeon, and/or XScale; and/or the like processor(s). The CPU interacts with memory through signal passing through conductive conduits to execute stored program code according to conventional data processing techniques. Such signal passing facilitates communication within the Asset/Portfolio Management System controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 786 may be of any standard form for powering small electronic circuit board devices such as the following power cells: alkaline, lithium hydride, lithium ion, nickel cadmium, solar cells, and/or the like. Other types of AC or DC power sources may be used as well. In the case of solar cells, in one embodiment, the case provides an aperture through which the solar cell may capture photonic energy. The power cell 786 is connected to at least one of the interconnected subsequent components of the Asset/Portfolio Management System thereby providing an electric current to all subsequent components. In one example, the power source 786 is connected to the system bus component 704. In an alternative embodiment, an outside power source 786 is provided through a connection across the I/O 708 interface. For example, a USB and/or IEEE 1394 connection carries both data and power across the connection and is therefore a suitable source of power.

Interface Adapters

Interface bus(ses) 707 may accept, connect, and/or communicate to a number of interface adapters, conventionally although not necessarily in the form of adapter cards, such as but not limited to: input output interfaces (I/O) 708, storage interfaces 711, network interfaces 710, and/or the like. Optionally, cryptographic processor interfaces 727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 711 may accept, communicate, and/or connect to a number of storage devices such as, but not limited to: storage devices 714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 710 may accept, communicate, and/or connect to a communications network 713. Through a communications network 713, the Asset/Portfolio Management System controller is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 710 may be used to engage with various communications network types 713. For example, multiple network interfaces may be employed to allow for the communication over broadcast, multicast, and/or unicast networks.

Input Output interfaces (I/O) 708 may accept, communicate, and/or connect to user input devices 712A, peripheral devices 712C, cryptographic processor devices 728, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device 712C is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 712A may be card readers, dongles, finger print readers, gloves, graphics tablets, joysticks, keyboards, mouse (mice), remote controls, retina readers, trackballs, trackpads, and/or the like.

Peripheral devices 712C may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the Asset/Portfolio Management System controller may be embodied as an embedded, dedicated, and/or monitor-less (i.e., headless) device, wherein access would be provided over a network interface connection.

Cryptographic units such as, but not limited to, microcontrollers, processors 726, interfaces 727, and/or devices 728 may be attached, and/or communicate with the Asset/Portfolio Management System controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 723. However, memory is a fungible technology and resource, thus, any number of memory embodiments may be employed in lieu of or in concert with one another. It is to be understood that the Asset/Portfolio Management System controller and/or a computer systemization may employ various forms of memory 723. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 723 will include ROM 706, RAM 705, and a storage device 714. A storage device 714 may be any conventional computer system storage. Storage devices may include a drum; a (fixed and/or removable) magnetic disk drive; a magneto-optical drive; an optical drive (i.e., CD ROM/RAM/Recordable (CD-R), ReWritable (RW), DVD R/RW, etc.); and/or other devices of the like. Thus, a computer systemization generally requires and makes use of memory.

Module Collection

The memory 723 may contain a collection of program and/or database modules and/or data such as, but not limited to: operating system module(s) 715 (operating system); information server module(s) 716 (information server); user interface module(s) 717 (user interface); Web browser module(s) 718 (Web browser); database(s) 720; cryptographic server module(s) 719 (cryptographic server); the Asset/Portfolio Management System module(s) 725; and/or the like (i.e., collectively a module collection). These modules may be stored and accessed from the storage devices and/or from storage devices accessible through an interface bus. Although non-conventional software modules such as those in the module collection, typically, are stored in a local storage device 714, they may also be loaded and/or stored in memory such as: peripheral devices, RAM, remote storage facilities through a communications network, ROM, various forms of memory, and/or the like.

Operating System

The operating system module 715 is executable program code facilitating the operation of the Asset/Portfolio Management System controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the Asset/Portfolio Management System controller to communicate with other entities through a communications network 713. Various communication protocols may be used by the Asset/Portfolio Management System controller as a subcarrier transport mechanism for interaction, such as, but not limited to: multicast, TCP/IP, UDP, unicast, and/or the like.

Information Server

An information server module 716 is stored program code that is executed by the CPU. The information server may be a conventional Internet information server such as, but not limited to Apache Software Foundation's Apache, Microsoft's Internet Information Server, and/or the. The information server may allow for the execution of program modules through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on the Asset/Portfolio Management System controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the Asset/Portfolio Management System database 720 operating systems, other program modules, user interfaces, Web browsers, and/or the like.

Access to the Asset/Portfolio Management System database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Asset/Portfolio Management System. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Asset/Portfolio Management System as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program module, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface module 717 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), mythTV, and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 718 is stored program code that is executed by the CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the Asset/Portfolio Management System enabled nodes. The combined application may be nugatory on systems employing standard Web browsers.

Cryptographic Server

A cryptographic server module 719 is stored program code that is executed by the CPU 703, cryptographic processor 726, cryptographic processor interface 727, cryptographic processor device 728, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Asset/Portfolio Management System may encrypt all incoming and/or outgoing communications and may serve as node within a virtual private network (VPN) with a wider communications network. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for an digital audio file. A cryptographic module may communicate to and/or with other modules in a module collection, including itself, and/or facilities of the like. The cryptographic module supports encryption schemes allowing for the secure transmission of information across a communications network to enable the Asset/Portfolio Management System module to engage in secure transactions if so desired. The cryptographic module facilitates the secure accessing of resources on the Asset/Portfolio Management System and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

The Asset/Portfolio Management System Database

The Asset/Portfolio Management System database module 720 may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Asset/Portfolio Management System database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the Asset/Portfolio Management System database is implemented as a data-structure, the use of the Asset/Portfolio Management System database 719 may be integrated into another module such as the Asset/Portfolio Management System module 725. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the APMS database module 720 includes several tables 720*a-d*. An applicant account table 720*a* includes fields related to Historical Finance Data. A User Account data 719*b* includes data related to the user account information, as well as scenario (and portfolio) data. A Modeling/Analysis table 720*c* includes fields that are used in establishing the scenario data, as well as facilitating modeling/analysis. A Report Generation table 720*d* includes fields related to the process of aggregating the scenario data, as well as generating and distributing the scenario reports.

In one embodiment, the Asset/Portfolio Management System database may interact with other database systems. For example, the system user may upload portfolio data in a standardized format from a non-APMS database.

In one embodiment, user programs may contain various user interface primitives, which may serve to update the Asset/Portfolio Management System. Also, various accounts may require custom database tables depending upon the environments and the types of clients the Asset/Portfolio Management System may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database modules 720*a-d*. The Asset/Portfolio Management System may be configured to keep track of various settings, inputs, and parameters via database controllers.

The Asset/Portfolio Management System database may communicate to and/or with other modules in a module collection, including itself, and/or facilities of the like. Most frequently, the Asset/Portfolio Management System database communicates with the Asset/Portfolio Management System module, other program modules, and/or the like. The database may contain, retain, and provide information regarding other nodes and data.

The Asset/Portfolio Management System

The Asset/Portfolio Management System module 725 is stored program code that is executed by the CPU. The Asset/Portfolio Management System affects accessing, obtaining and the provision of information, services, transactions, and/or the like across various communications networks. The Asset/Portfolio Management System facilitates the processing/modeling/analysis associated with the APMS.

The Asset/Portfolio Management System module enabling access of information between nodes may be developed by employing standard development tools such as, but not limited to: (ANSI) (Objective-) C (++), Apache modules, binary executables, database adapters, Java, JavaScript, mapping tools, procedural and object oriented development tools, PERL, Python, shell scripts, SQL commands, web application server extensions, WebObjects, and/or the like. In one embodiment, the Asset/Portfolio Management System server employs a cryptographic server to encrypt and decrypt communications. The Asset/Portfolio Management System module may communicate to and/or with other modules in a module collection, including itself, and/or facilities of the like. Most frequently, the Asset/Portfolio Management System module communicates with the Asset/Portfolio Management System database, operating systems, other program modules, and/or the like. The Asset/Portfolio Management System may contain, communicate, generate, obtain, and/or provide program module, system, user, and/or data communications, requests, and/or responses.

Distributed the Asset/Portfolio Management System

The structure and/or operation of any of the Asset/Portfolio Management System node controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the Asset/Portfolio Management System controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A computer processor-implemented method of performing analysis of a portfolio comprising:
    receiving a request for an investment portfolio analysis report;
    receiving portfolio asset allocation data, indicating a plurality of portfolio assets that make up the portfolio;
    setting a target time period and dividing the time period into Z subperiods;
    associating via a computer processor each of the plurality of portfolio assets with one of the following tax characteristic groups: income not taxed group, income taxed at the income tax rate group and income taxed at the capital gains tax rate group;
    determining via a computer processor covariances between the income not taxed group, income taxed at the income tax rate group and income taxed at the capital gains tax rate group;
    using the covariances to generate via a computer processor N sets of dependent random variables, for each Z subperiod, where each of the N sets of dependent random variables provides a simulated performance of the income not taxed group, income taxed at the income tax rate group and income taxed at the capital gains tax rate group for the subperiod;
    computing N simulated portfolio values for the income not taxed group, income taxed at the income tax rate group and income taxed at the capital gains tax rate group using N sets of dependant random variables, for each Z subperiod, where the computation of the value for each Z subperiod comprises:
        using the portfolio values and cost basis from the previous Z subperiod to calculate the realized and unrealized gains,
        accounting for spending and any resulting tax payments,
        rebalancing the income not taxed group, income taxed at the income tax rate group and income taxed at the capital gains tax rate group, and
        accounting for tax consequences of rebalancing to provide Z subperiod values; and
    generating via a computer processor an investment portfolio analysis report based on the computed N simulated portfolio values and outputting the portfolio analysis report responsive to the received portfolio analysis report request.

2. The method of claim 1, wherein the N sets of dependent random variables are generated from Monte Carlo generated independent random variables and the covariances and expected returns of the income not taxed group, income taxed at the income tax rate group and income taxed at the capital gains tax rate group.

3. The method of claim 1, wherein the covariances between the income not taxed group, income taxed at the income tax rate group and income taxed at the capital gains tax rate group are determined based on the covariances of the assets in the income not taxed group, income taxed at the income tax rate group and income taxed at the capital gains tax rate group.

4. The method of claim 1, wherein the simulated portfolio values includes two or more of the following aspects of the income not taxed group, income taxed at the income tax rate group and income taxed at the capital gains tax rate group performance: returns, incomes, turnovers, short term gains, and long term gains.

5. The method of claim 1, further comprising adjusting for inflation when determining the simulated portfolio values.

6. The method of claim 1, further comprising accounting for inflows and outflows during each Z subperiod when determining the simulated portfolio values.

7. The method of claim 1, wherein the tax characteristic groups further comprise a group containing assets taxed according to another taxing rule.

8. The method of claim 1, wherein generating the portfolio analysis report further comprises determining 90th percentile, median and 10th percentile for N sorted simulated portfolio values and indicating the 90th percentile, median and 10th percentile in the output portfolio analysis report.

9. A non-transitory medium readable by a processor to perform analysis of a portfolio comprising:
   instruction signals in the processor readable medium, wherein the instruction signals are issuable by the processor to:
      receive portfolio asset allocation data, indicating a plurality of portfolio assets that make up the portfolio;
      set a target time period and divide the time period into Z subperiods;
      associate each of the plurality of portfolio assets with one of the following tax characteristic groups: income not taxed group, income taxed at the income tax rate group and income taxed at the capital gains tax rate group;
      determine covariances between the income not taxed group, income taxed at the income tax rate group and income taxed at the capital gains tax rate group;
      use the covariances to generate N sets of dependent random variables, for each Z subperiod, where each of the N sets of dependent random variables provides a simulated performance of the income not taxed group, income taxed at the income tax rate group and income taxed at the capital gains tax rate group for the subperiod;
      compute N simulated portfolio values for the income not taxed group, income taxed at the income tax rate group and income taxed at the capital gains tax rate group using N sets of dependant random variables, for each Z subperiod, where the computation of the value for each Z subperiod comprises:
         using the portfolio values and cost basis from the previous Z subperiod to calculate the realized and unrealized gains,
         accounting for spending and any resulting tax payments,
         rebalancing the income not taxed group, income taxed at the income tax rate group and income taxed at the capital gains tax rate group, and
         accounting for tax consequences of rebalancing to provide Z subperiod values.

10. The non-transitory medium of claim 9, wherein the covariances between the income not taxed group, income taxed at the income tax rate group and income taxed at the capital gains tax rate group are determined based on the covariances of the assets in the income not taxed group, income taxed at the income tax rate group and income taxed at the capital gains tax rate group.

11. The non-transitory medium of claim 9, wherein the simulated portfolio values includes two or more of the following aspects of the income not taxed group, income taxed at the income tax rate group and income taxed at the capital gains tax rate group performance: returns, incomes, turnovers, short term gains, and long term gains.

12. The non-transitory medium of claim 9, wherein the tax characteristic groups further comprise a group containing assets taxed according to another taxing rule.

13. A computer program product for portfolio analysis, comprising:
   computer readable program code means stored on a computer readable medium for receiving portfolio asset allocation data indicating a plurality of portfolio assets that make up a portfolio;
   computer readable program code means stored on a computer readable medium for setting a target time period and dividing the time period into Z subperiods;
   computer readable program code means stored on a computer readable medium for associating each of the plurality of portfolio assets with one of the following tax characteristic groups: income not taxed group, income taxed at the income tax rate group and income taxed at the capital gains tax rate group;
   computer readable program code means stored on a computer readable medium for determining covariances between the income not taxed group, income taxed at the income tax rate group and income taxed at the capital gains tax rate group;
   computer readable program code means stored on a computer readable medium for using the covariances to generate N sets of dependent random variables, for each Z subperiod, where each of the N sets of dependent random variables provides a simulated performance of the income not taxed group, income taxed at the income tax rate group and income taxed at the capital gains tax rate group for the subperiod;
   computer readable program code means stored on a computer readable medium for calculating N simulated portfolio values for the income not taxed group, income taxed at the income tax rate group and income taxed at the capital gains tax rate group using N sets of dependant random variables, for each Z subperiod, where the calculation of the value for each Z subperiod comprises:
      using the portfolio values and cost basis from the previous Z subperiod to calculate the realized and unrealized gains,
      accounting for spending and any resulting tax payments,
      rebalancing the income not taxed group, income taxed at the income tax rate group and income taxed at the capital gains tax rate group, and
      accounting for tax consequences of rebalancing to provide Z subperiod values; and
   computer readable program code means stored on a computer readable medium for outputting the calculated N simulated portfolio values.

14. The computer program product of claim 13, wherein the N sets of dependent random variables are generated based on Monte Carlo generated values of independent random variables and the covariances and expected returns of the income not taxed group, income taxed at the income tax rate group and income taxed at the capital gains tax rate group.

15. The computer program product of claim 13, wherein the covariances between the income not taxed group, income taxed at the income tax rate group and income taxed at the capital gains tax rate group are determined based on the covariances of the assets in the income not taxed group, income taxed at the income tax rate group and income taxed at the capital gains tax rate group.

16. The computer program product of claim 13, wherein the simulated portfolio values includes two or more of the following aspects of the income not taxed group, income taxed at the income tax rate group and income taxed at the capital gains tax rate group performance: returns, incomes, turnovers, short term gains, and long term gains.

17. The computer program product of claim 13, further comprising:
computer readable program code means stored on a computer readable medium for adjusting for inflation when determining the simulated portfolio values.

18. The computer program product of claim 13, further comprising:
computer readable program code means stored on a computer readable medium for accounting for inflows and outflows during each Z subperiod when determining the simulated portfolio values.

19. The computer program product of claim 13, wherein the tax characteristic groups further comprise a group containing assets taxed according to another taxing rule.

20. A portfolio analysis system for providing analysis of a portfolio, comprising:
means to receive portfolio asset allocation data, indicating a plurality of portfolio assets that make up a portfolio;
means to set a target time period and dividing the time period into Z subperiods;
means to associate each of the plurality of portfolio assets with one of the following tax characteristic groups: income not taxed group, income taxed at the income tax rate group and income taxed at the capital gains tax rate group;
means to determine covariances between the income not taxed group, income taxed at the income tax rate group and income taxed at the capital gains tax rate group;
means to use the covariances to generate N sets of dependent random variables, for each Z subperiod, where each of the N sets of dependent random variables provides a simulated performance of the income not taxed group, income taxed at the income tax rate group and income taxed at the capital gains tax rate group for the subperiod;
means to compute N simulated portfolio values for the income not taxed group, income taxed at the income tax rate group and income taxed at the capital gains tax rate group using N sets of dependant random variables, for each Z subperiod, where the computation of the value for each Z subperiod comprises:
using the portfolio values and cost basis from the previous Z subperiod to calculate the realized and unrealized gains,
accounting for spending and any resulting tax payments,
rebalancing the income not taxed group, income taxed at the income tax rate group and income taxed at the capital gains tax rate group, and
accounting for tax consequences of rebalancing to provide Z subperiod values.

21. The system of claim 20, wherein the N sets of dependent random variables are generated from Monte Carlo generated independent random variables and the covariances and expected returns of the income not taxed group, income taxed at the income tax rate group and income taxed at the capital gains tax rate group.

22. The system of claim 20, wherein the covariances between the income not taxed group, income taxed at the income tax rate group and income taxed at the capital gains tax rate group are determined based on the covariances of the assets in the income not taxed group, income taxed at the income tax rate group and income taxed at the capital gains tax rate group.

23. The system of claim 20, wherein the simulated portfolio values includes two or more of the following aspects of the income not taxed group, income taxed at the income tax rate group and income taxed at the capital gains tax rate group performance: returns, incomes, turnovers, short term gains, and long term gains.

24. The system of claim 20, further comprising means to adjust for inflation when determining the simulated portfolio values.

25. The system of claim 20, further comprising means to account for inflows and outflows during each Z subperiod when determining the simulated portfolio values.

26. The system of claim 20, wherein the tax characteristic groups further comprise a group containing assets taxed according to another taxing rule.

27. The system of claim 20, further comprising means to output the N sorted simulated portfolio values and indicating the 90th percentile, median and 10th percentile.

* * * * *